United States Patent
Snydacker

(10) Patent No.: US 10,150,056 B2
(45) Date of Patent: Dec. 11, 2018

(54) LITHIUM EXTRACTION WITH COATED ION EXCHANGE PARTICLES

(71) Applicant: Lilac Solutions, Inc., Middletown, RI (US)

(72) Inventor: David Henry Snydacker, San Francisco, CA (US)

(73) Assignee: LILAC SOLUTIONS, INC., Middletown, RI (US)

( * ) Notice: Subject to any disclaimer, the term of this patent is extended or adjusted under 35 U.S.C. 154(b) by 0 days.

(21) Appl. No.: 15/811,415

(22) Filed: Nov. 13, 2017

(65) Prior Publication Data

US 2018/0133619 A1 May 17, 2018

Related U.S. Application Data

(60) Provisional application No. 62/421,934, filed on Nov. 14, 2016.

(51) Int. Cl.
| | |
|---|---|
| *B01D 15/00* | (2006.01) |
| *B01D 15/36* | (2006.01) |
| *B01J 20/282* | (2006.01) |

(52) U.S. Cl.
CPC .......... *B01D 15/361* (2013.01); *B01J 20/282* (2013.01)

(58) Field of Classification Search
CPC ... B01J 20/02; B01J 20/28026; B01D 15/361; C02F 1/42
USPC ............... 423/179.5; 428/403–407; 252/184; 210/656–688
See application file for complete search history.

(56) References Cited

U.S. PATENT DOCUMENTS

| | | |
|---|---|---|
| 3,793,433 A | 2/1974 | Seeley et al. |
| 4,116,858 A | 9/1978 | Lee et al. |
| 4,159,311 A | 6/1979 | Bauman et al. |
| 8,506,851 B2 | 8/2013 | Ravet et al. |
| 8,741,150 B2 | 6/2014 | Chung et al. |
| 8,778,289 B2 | 7/2014 | Chon et al. |
| 9,034,294 B1 | 5/2015 | Harrison et al. |
| 2010/0116748 A1 | 5/2010 | Rasmussen et al. |
| 2011/0044882 A1 | 2/2011 | Buckley et al. |
| 2011/0174739 A1 | 7/2011 | Chung et al. |
| 2014/0113197 A1 | 4/2014 | Xiao et al. |
| 2015/0013499 A1 | 1/2015 | Asano et al. |
| 2015/0083667 A1 | 3/2015 | Stouffer |
| 2017/0217796 A1 | 8/2017 | Snydacker et al. |
| 2018/0080133 A1 | 3/2018 | Smith et al. |

FOREIGN PATENT DOCUMENTS

| | | |
|---|---|---|
| CN | 103794779 A | 5/2014 |
| WO | WO-2016172017 A1 | 10/2016 |

OTHER PUBLICATIONS

Chitrakar et al. Lithium recovery from salt lake brine by H2TiO3. Dalton Trans 43:8933-8939 (2014).
Chitrakar et al. Selective Uptake of Lithium Ion from Brine by H1.33Mn1.67O4 and H1.6Mn1.6O4. Chem Lett 41:1647-1649 (2012).
Cho et al. High-Performance ZrO2-Coated LiNiO2 Cathode Material. Electrochem Solid-State Lett 4(10):A159-A161 (2001).
Department of Energy. Ion Exchange Materials for Lithium Extraction (Topic: 15, Subtopic: e)—Abstract. Available at https://www.sbir.gov/sbirsearch/detail/1307793 (3 pgs.) (2017).
Larumbe et al. Effect of a SiO2 coating on the magnetic properties of Fe3O4 nanoparticles. JPhys: Condens Matter 24(26):266007 (2012).
Oh et al. Double Carbon Coating of LiFePO4 as High Rate Electrode for Rechargeable Lithium Batteries. Adv. Mater. 22:4842-4845 (2010).
Pareja et al. Corrosion behaviour of zirconia barrier coatings on galvanized steel. Surface and Coatings Technology 200(22-23):6606-6610 (2006).
Tarakina et al. Defect crystal structure of new TiO(OH)2 hydroxide and related lithium salt Li2TiO3. Dalton Trans 39:8168-8176 (2010).
Patel et al. Ionic and electronic conductivities of atomic layer deposition thin film coated lithium ion battery cathode particles. RSC Advances 6:98768-98776 (2016).
PCT/US2017/061384 International Search Report and Written Opinion dated Feb. 14, 2018.
Co-pending U.S. Appl. No. 16/052,381, filed Aug. 1, 2018.
U.S. Appl. No. 16/052,381 Office Action dated Nov. 1, 2018.

*Primary Examiner* — Steven J Bos

(74) *Attorney, Agent, or Firm* — Wilson Sonsini Goodrich & Rosati

(57) ABSTRACT

The present invention relates to the extraction of lithium from liquid resources such as natural and synthetic brines, leachate solutions from minerals, and recycled products.

22 Claims, 3 Drawing Sheets

US 10,150,056 B2

LITHIUM EXTRACTION WITH COATED ION EXCHANGE PARTICLES

CROSS-REFERENCE

This application claims the benefit of U.S. Provisional Application No. 62/421,934, filed Nov. 14, 2016, which application is incorporated herein by reference.

BACKGROUND OF THE INVENTION

Lithium is an essential element for high-energy rechargeable batteries and other technologies. Lithium can be found in a variety of liquid solutions, including natural and synthetic brines, leachate solutions from minerals, and recycled products.

SUMMARY OF THE INVENTION

Lithium can be extracted from liquid resources using an ion exchange process based on inorganic ion exchange materials. Inorganic ion exchange materials absorb lithium ions from a liquid resource while releasing hydrogen ions, and then elute lithium ions in acid while absorbing hydrogen ions. The ion exchange process can be repeated to extract lithium ions from a liquid resource and yield a concentrated lithium ion solution. The concentrated lithium ion solution can be further processed into chemicals for the battery industry or other industries.

A major challenge for lithium extraction using inorganic ion exchange materials is the dissolution and degradation of materials. This is especially so during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decrease the performance and lifespan of the materials. There is a need therefore for a method of extracting lithium ions in which inorganic ion exchange materials are protected from dissolution and degradation.

An aspect described herein is a coated ion exchange particle comprising an ion exchange material and a coating material.

In some embodiments, the coating material prevents dissolution of the ion exchange material. In some embodiments, the coating material allows diffusion of lithium ions and hydrogen ions to and from the ion exchange material.

In some embodiments, the coating material comprises a carbide, a nitride, an oxide, a phosphate, a fluoride, a polymer, carbon, a carbonaceous material, or combinations thereof. In some embodiments, the coating material comprises $TiO_2$, $ZrO_2$, $MoO_2$, $SnO_2$, $Nb_2O_5$, $Ta_2O_5$, $Li_2TiO_3$, $SiO_2$, $Li_2ZrO_3$, $Li_2MoO_3$, $LiNbO_3$, $LiTaO_3$, $AlPO_4$, $LaPO_4$, $ZrSiO_4$, $ZrP_2O_7$, $MOP_2O_7$, $MO_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combination thereof. In some embodiments, the coating material comprises $TiO_2$. In some embodiments, the coating material comprises $SiO_2$. In some embodiments, the coating material comprises $ZrO_2$.

In some embodiments, the ion exchange material comprises an oxide, a phosphate, an oxyfluoride, a fluorophosphate, or combinations thereof. In some embodiments, the ion exchange material is selected from $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof. In some embodiment, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y is independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof.

In some embodiments, the coated ion exchange particle has an average diameter of less than 100 μm. In some embodiments, the coated ion exchange particle has an average diameter of less than 10 μm. In some embodiments, the coated ion exchange particle has an average diameter of less than 1,000 nm. In some embodiments, the coated ion exchange particle has an average diameter of less than 100 nm.

An aspect described herein is a porous structure for ion exchange comprising: a) a structural support; and b) a plurality of particles selected from coated ion exchange particles, uncoated ion exchange particles, and a combination thereof.

In some embodiments, the structural support comprises a polymer, an oxide, a phosphate, or combinations thereof. In some embodiments, the structural support comprises a polymer. In some embodiments, the polymer is polyvinylidene fluoride, polyvinyl fluoride, polyvinyl chloride, polyvinylidene chloride, a chloro-polymer, a fluoro-polymer, a fluoro-chloro-polymer, polyethylene, polypropylene, polyphenylene sulfide, polytetrafluoroethylene, sulfonated polytetrafluoroethylene, polystyrene, polydivinylbenzene, polybutadiene, a sulfonated polymer, a carboxylated polymer, polyacrylonitrile, tetrafluoroethylene, perfluoro-3,6-dioxa-4-ethyl-7-octene-sulfonic acid (NAFION® (copolymer of perfluoro-3,6-dioxa-4-methyl-7octene-sulfonic acid and tetrafluoroethylene)), copolymers thereof, or combinations thereof.

In some embodiments, the porous structure has a connected network of pores that enables liquid solutions to penetrate quickly into the bead and deliver lithium ion and hydrogen ions to and from ion exchange particles in the bead. In some embodiments, the porous structure has a connected network of pores that are structured to enable fast infiltration by liquid solutions to create liquid diffusion channels from the bead surface to the ion exchange particles in the bead. In some embodiments, the porous bead has a hierarchical connected network of pores with a distribution of pore sizes such that the pore network creates pathways between the surface of the bead and the ion exchange particles in the bead. In some embodiments, the porous structure includes pores with diameters ranging from less than 10 μm to greater than 50 μm. In some embodiments, the porous structure includes pores with diameters ranging from more than 1 μm, more than 2 μm, more than 4 μm, more than 6 μm, more than 8 μm, more than 10 μm, more than 15 μm, more than 20 μm, more than 40 μm, more than 60 μm, more than 80 μm, more than 100 μm, less than 2 μm, less than 4 μm, less than 6 μm, less than 8 μm, less than 10 μm, less than 15 μm, less than 20 μm, less than 40 μm, less than 60 μm, less than 80 μm, less than 100 μm, from about 1 μm to about 100 μm, from about 5 μm to about 75 μm, or from about 10 μm to about 50 μm.

In some embodiments, the porous structure forms a porous membrane, porous bead, other porous structure, dense membrane, dense bead, scaffold, a woven membrane, a wound membrane, a spiral wound membrane, or combinations thereof. In some embodiments, the porous structure forms a porous membrane, a porous bead, or combinations thereof.

In some embodiments, the coated ion exchange particles comprise an ion exchange material and a coating material. In some embodiments, the coating material of the coated ion exchange particles prevents dissolution of the ion exchange material. In some embodiments, the coating material of the coated ion exchange particles allows diffusion of lithium ions and hydrogen ions to and from the ion exchange material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles comprises $TiO_2$, $ZrO_2$, $MoO_2$, $SnO_2$, $Nb_2O_5$, $Ta_2O_5$, $Li_2TiO_3$, $SiO_2$, $Li_2ZrO_3$, $Li_2MoO_3$, $LiNbO_3$, $LiTaO_3$, $AlPO_4$, $LaPO_4$, $ZrSiO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combination thereof. In some embodiments, the coating material of the coated ion exchange particles comprises $TiO_2$. In some embodiments, the coating material of the coated ion exchange particles comprises $SiO_2$. In some embodiments, the coating material of the coated ion exchange particles comprises $ZrO_2$.

In some embodiments, the ion exchange material of the coated ion exchange particle comprises an oxide, a phosphate, an oxyfluoride, a fluorophosphate, or combinations thereof. In some embodiments, the ion exchange material of the coated ion exchange particle is selected from $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiP_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof. In some embodiment, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y is independently selected from 0.1, 0.2, 0.3, 0.4, 0.5, 0.6, 0.7, 0.8, 0.9, 1, 2, 3, 4, 5, 6, 7, 8, 9, or 10. In some embodiments, the ion exchange material of the coated ion exchange particle is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof.

In some embodiments, the coated ion exchange particle has an average diameter of less than 100 µm. In some embodiments, the coated ion exchange particle has an average diameter of less than 10 µm. In some embodiments, the coated ion exchange particle has an average diameter of less than 1,000 nm. In some embodiments, the coated ion exchange particle has an average diameter of less than 100 nm.

In some embodiments, the uncoated ion exchange particles comprise an ion exchange material. In some embodiments, the ion exchange material of the uncoated ion exchange particle comprises an oxide, a phosphate, an oxyfluoride, a fluorophosphate, or combinations thereof. In some embodiments, the ion exchange material of the uncoated ion exchange particle is selected $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof. In some embodiment, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y is independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material of the uncoated ion exchange particle is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof.

In some embodiments, the uncoated ion exchange particle has an average diameter of less than 100 µm. In some embodiments, the uncoated ion exchange particle has an average diameter of less than 10 µm. In some embodiments, the uncoated ion exchange particle has an average diameter of less than 1,000 nm. In some embodiments, the uncoated ion exchange particle has an average diameter of less than 100 nm.

In some embodiments, the porous structure is in the form of a porous bead. In some embodiments, the porous bead is approximately spherical. In some embodiments, the porous bead has an average diameter of less than 10 cm. In some embodiments, the porous bead has an average diameter of less than 1 cm. In some embodiments, the porous bead has an average diameter of less than 1 mm. In some embodiments, the porous bead had an average diameter of less than 100 µm. In some embodiments, the porous bead has an average diameter of less than 10 µm. In some embodiments, the porous bead is approximately spherical with an average diameter of from about 1 µm to about 100 µm, from about 1 mm to about 100 mm, from about 1 mm to about 80 mm, from about 1 mm to about 60 mm, from about 1 to about 40 mm, from about 1 to about 20 mm, from about 1 to about 10 mm, from about 1 cm to about 10 cm, from about 1 cm to about 8 cm, from about 1 cm to about 6 cm, or from about 1 cm to about 4 cm.

In some embodiments, the porous bead is tablet-shaped. In some embodiments, the porous bead has a diameter of less than 20 mm and a height of less than 20 mm. In some embodiments, the porous bead has a diameter of less than 8 mm and a height of less than 8 mm. In some embodiments, the porous bead has a diameter of less than 4 mm and a height of less than 4 mm. In some embodiments, the porous bead has a diameter of less than 2 mm and a height of less than 2 mm. In some embodiments, the porous bead has a diameter of less than 1 mm and a height of less than 1 mm.

An aspect described herein is a method of extracting lithium from a liquid resource, comprising: contacting the coated ion exchange particle with a liquid resource to produce lithiated coated ion exchange particles; and treating the lithiated coated ion exchange particles with an acid solution to produce a salt solution comprising lithium ions. In some embodiments, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the acid solution comprises hydrochloric acid, sulfuric acid, phosphoric acid, hydrobromic acid, chloric acid, perchloric acid, nitric acid, formic acid, acetic acid, or combinations thereof. In some embodiments, the salt solution further comprises an impurity derived from the coated ion exchange particle. In some embodiments, the impurity is present in a concentration of more than 1 ppb, more than 5 ppb, more than 10 ppb, more than 100 ppb, more than 1 ppm, more than 2 ppm, more than 4 ppm, more than 6 ppm, more than 8 ppm, less than 10 ppm, less than 8 ppm, less than 6 ppm, less than 4 ppm, less than 2 ppm, less than 1 ppm, less than 100 ppb, less than 10 ppb, less than 5 ppb, from about 1 ppb to about 10 ppm, from about 5 ppb to about 10 ppm, from about 10 ppb to about 10 ppm, from about 50 ppb to about 10 ppm, from about 100 ppb to about 10 ppm, from about 1 ppm to about 10 ppm, from about 2 ppm to about 10 ppm, from about 4 ppm to about 10 ppm, from about 6 ppm to about ppm, or from about 8 ppm to about 10 ppm.

An aspect described herein is a method of extracting lithium from a liquid resource, comprising: contacting the porous structure with a liquid resource to produce a lithiated porous structure; and treating the lithiated porous structure with an acid solution to produce a salt solution comprising lithium ions. In some embodiments, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the acid solution comprises hydrochloric acid, sulfuric acid, phosphoric acid, hydrobromic acid, chloric acid, perchloric acid, nitric acid, formic acid, acetic acid, or combinations thereof.

An aspect described herein is a method of extracting lithium from a liquid resource, comprising: contacting the porous bead with a liquid resource to produce lithiated porous beads; and treating the lithiated porous beads with an acid solution to produce a salt solution comprising lithium ions. In some embodiments, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments, the acid solution comprises hydrochloric acid, sulfuric acid, phosphoric acid, hydrobromic acid, chloric acid, perchloric acid, nitric acid, formic acid, acetic acid, or combinations thereof.

In some embodiments, the method is conducted in a column.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The terms "lithium", "lithium ion", and "$Li^+$" are used interchangeably in the present specification and these terms are synonymous unless specifically noted to the contrary. The terms "hydrogen", "hydrogen ion", "proton", and "$H^+$" are used interchangeably in the present specification and these terms are synonymous unless specifically noted to the contrary.

Coated Ion Exchange Particle

In an aspect described herein are coated ion exchange particles comprising ion exchange material and coating material.

Coating Material of Coated Ion Exchange Particle

Figure 1:
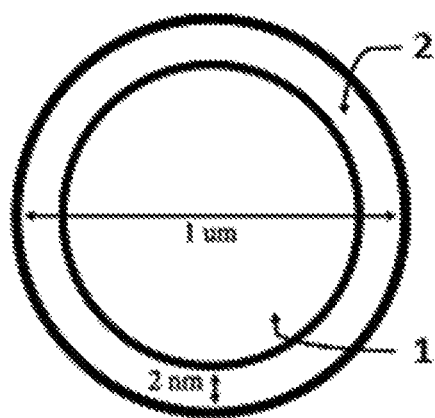
FIG. 1 depicts the coated ion exchange particle with ion exchange material 1 and a coating material 2 protecting the coated ion exchange particle surface.

In some embodiments, the coating material prevents the dissolution of the ion exchange material. In some embodiments, the coating material protects the ion exchange material from dissolution and degradation during lithium elution in acid, during lithium uptake from a liquid resource, and during other embodiments of an ion exchange process. In some embodiments, the coating material enables the use of concentrated acids in the ion exchange process to: (1) yield concentrated lithium ion solutions; (2) shift the equilibrium such that lithium ions move from the ion exchange material; and (3) maximize ion exchange capacity of the ion exchange material. One example of a coated ion exchange particle is shown in FIG. 1.

In some embodiments, the coating material allows diffusion to and from the ion exchange material. In particular, the coating material facilitates diffusion of lithium ions and hydrogen ions between the coated ion exchange particles and various liquid resources. In some embodiments, the coating material enables the adherence of coated ion exchange particles to a structural support and suppresses structural and mechanical degradation of the coated ion exchange particles.

In some embodiments, the coating material comprises a carbide, a nitride, an oxide, a phosphate, a fluoride, a polymer, carbon, a carbonaceous material, or combinations thereof. In some embodiments, the coating material comprises $Nb_2O_5$, $Ta_2O_5$, $MoO_2$, $TiO_2$, $ZrO_2$, $MoO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, the coating material comprises polyvinylidene difluoride, polyvinyl chloride, a fluoro-polymer, a chloro-polymer, or a fluoro-chloro-polymer. In some embodiments, the coating material comprises $TiO_2$, $ZrO_2$, $SiO_2$ $MoO_2$, $Li_2TiO_3$, $Li_2ZrO_3$, $Li_2MnO_3$, $ZrSiO_4$, or $LiNbO_3$, $AlF_3$, $SiC$, $Si_3N_4$, graphitic carbon, amorphous carbon, diamond-like carbon, or combinations thereof. In some embodiments, the coating material comprises $TiO_2$, $SiO_2$, or $ZrO_2$. In some embodiments, the coating material comprises $TiO_2$. In some embodiments, the coating material comprises $SiO_2$. In some embodiments, the coating material comprises $ZrO_2$.

In some embodiments, the coating coats primary ion exchange particles or secondary ion exchange particles. In some embodiments, the coating coats both the primary ion exchange particles and the secondary ion exchange particles. In some embodiments, the primary ion exchange particles have a first coating and the secondary ion exchange particles have a second coating that is identical, similar, or different in composition to the first coating.

In some embodiments, the coating material has a thickness of less than 1 nm, less than 10 nm, less than 100 nm, less than 1,000 nm, less than 10,000 nm, more than 1 nm, more than 10 nm, more than 100 nm, more than 1,000 nm, more than 10,000 nm, from about 1 nm to about 10,000 nm, from about 10 nm, to about 1,000 nm, or from about 100 to about 1,000 nm. In some embodiments, the coating material has a thickness of less than 5 nm, less than 10 nm, less than 50 nm, less than 100 nm, less than 500 nm, more than 1 nm, more than 5 nm, more than 10 nm, more than 50 nm, more than 100 nm, from about 1 nm to about 500 nm, from about 1 nm to about 100 nm, from about 1 nm to about 50 nm, from about 1 nm to about 10 nm, from about 1 nm to about 5 nm, or from about 5 nm to about 100 nm.

In some embodiments, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In some embodiments, the coating material is deposited by a method such as chemical vapor deposition, hydrothermal, solvothermal, sol-gel, precipitation, microwave sol-gel, chemical precipitation, or combinations thereof. In some embodiments, the coating materials is deposited in a reactor that is a batch tank reactor, a continuous tank reactor, a batch furnace, a continuous furnace, a tube furnace, a rotary tube furnace, or combinations thereof.

In some embodiments, the coating material is deposited in a reactor by suspending the ion exchange material in a solvent with reagents that is added all at once or added over time. In some embodiments, the reagents are added in a specific time series to control reaction rates and coating depositions. In some embodiments, the solvent is aqueous or non-aqueous. In some embodiments, the solvent is an alcohol such as ethanol, propanol, butanol, pentanol, hexanol, septanol, or octanol. In some embodiments, the reagents include metal chlorides, metal oxides, metal alkoxides, metal oxychlorides, metalloid oxides, metalloid alkoxides, metalloid chlorides, metalloid oxychlorides, or combinations thereof. In some embodiments, the reagents include monomers, oligomers, polymers, gels, or combinations thereof. In some embodiments, the reagents include water, oxidants, reductants, acids, bases, or combinations thereof. In some embodiments, the reagents are added in the presence of catalysts such as acids, bases, or combinations thereof. In some embodiments, the reagents are added during a time period of less than 1 minute, less than 1 hour, less than 1 day, less about 1 week, more than 1 minute, more than 1 hour, more than 1 day, from about 1 minute to about 60 minutes, from about 1 hour to about 24 hours, or from about 1 day to about 7 days. In some embodiments, the reagents are dripped into the reactor continuously or at intervals. In some embodiments, multiple reagents are added to the reactor at different rates. In some embodiments, some reagents are combined separately and reacted to form a gel or polymer prior to addition to the reactor.

In some embodiments, the freshly coated ion exchange material is heated to one or more temperatures to age, dry, react, or crystallize the coating. In some embodiments, the freshly coated ion exchange material is heated to a temperature of less than about 100° C., less than about 200° C., less than about 300° C., less than about 400° C., less than about 500° C., less than about 600° C., less than about 700° C., or less than about 800° C. In some embodiments, the freshly coated ion exchange material is heated to a temperature of more than about 100° C., more than about 200° C., more than about 300° C., more than about 400° C., more than about 500° C., more than about 600° C., more than about 700° C., or more than about 800° C. In some embodiments, the freshly coated ion exchange material is heated to a temperature from about 100° C. to about 800° C., from about 200° C. to about 800° C., from about 300° C. to about 700° C., from about 400° C. to about 700° C., from about 500° C. to about 700° C., from about 100° C. to about 300° C., from about 200° C. to about 400° C., from about 300° C. to about 500° C., from about 400° C. to about 600° C., from about 500° C. to about 700° C., or from about 600° C. to about 800° C. In some embodiments, the freshly coated ion exchange material is heated in an atmosphere of air comprising oxygen, nitrogen, hydrogen, argon, or combinations thereof. In some embodiments, the freshly coated ion exchange material is heated for a time period of less than about 1 hour, less than about 2 hours, less than about 4 hours, less than about 8 hours, less than about 24 hours, more than 1 hour, more than 2 hours, more than 4 hours, more than 8 hours, from about 0.5 hours to about 24 hours, from about 0.5 hours to about 8 hours, from about 0.5 hours to about 4 hours, from about 0.5 hours to about 2 hours, or from about 0.5 hours to about 1 hour.

In some embodiments, the coating material is deposited with physical characteristics such as crystalline, amorphous, full coverage, partial coverage, uniform, non-uniform, or combinations thereof. In some embodiments, multiple coatings are deposited on the ion exchange material in an arrangement such as concentric, patchwork, or combinations thereof.

Ion Exchange Material of Coated Ion Exchange Particle

In some embodiments, the ion exchange material is suitable for high lithium absorption capacity and for lithium ions in a liquid resource relative to other ions such as sodium ions and magnesium ions. In some embodiments, the ion exchange material is suitable for strong lithium ion uptake in liquid resources including those with low concentrations of lithium ions, facile elution of lithium ions with a small excess of acid, and fast ionic diffusion.

In some embodiments, the ion exchange material comprises an oxide, a phosphate, an oxyfluoride, a fluorophosphate, or combinations thereof. In a further embodiment, the ion exchange material comprises $LiFePO_4$, $LiMnPO_4$, $Li_2MO_3$ (M=Ti, Mn, Sn), $Li_4Mn_5O_{12}$, $Li_4Ti_5O_{12}$, $LiMn_2O_4$, $Li_{1.6}Mn_{1.6}O_4$, $LiMO_2$ (M=Al, Cu, Ti), $Li_4TiO_4$, $Li_7T_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof. In some embodiment, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y is independently selected from 0.1, 0.2, 0.3, 0.4, 0.5, 0.6, 0.7, 0.8, 0.9, 1, 2, 3, 4, 5, 6, 7, 8, 9, and 10. In some embodiments, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In some embodiments, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In some embodiments, the ion exchange material is synthesized by a method such as chemical precipitation, hydrothermal, solid state, microwave, or combinations thereof.

In some embodiments, the ion exchange materials are synthesized in a lithiated state with a sub-lattice fully or partly occupied by lithium ions. In some embodiments, the ion exchange materials are synthesized in a hydrated state with a sub-lattice fully or partly occupied by hydrogen ions.

In some embodiments, the ion exchange material and the coating material form one or more concentration gradients where the chemical composition of the coated ion exchange particle varies between two or more compositions. In some embodiments, the chemical composition varies between the ion exchange materials and the coating in a manner that is continuous, discontinuous, or continuous and discontinuous in different regions of the coated ion exchange particle. In some embodiments, the ion exchange materials and the coating materials form a concentration gradient that extends over a thickness of less than 1 nm, less than 10 nm, less than 100 nm, less than 1,000 nm, less than 10,000 nm, less than 100,000 nm, more than 1 nm, more than 10 nm, more than 100 nm, more than 1,000 nm, more than 10,000 nm, from about 1 nm to about 100,000 nm, from about 10 nm to about 10,000 nm, or from about 100 to about 1,000 nm.

Particle Size of Coated Ion Exchange Particle

In some embodiments, the coated ion exchange particle has an average diameter of less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm. In some embodiments, the coated ion exchange particles have an average size of less than about 100 nm, less than about 1,000 nm, or less than about 10,000 nm. In some embodiments, the coated ion exchange particles are secondary particles comprised of smaller primary particles, wherein the secondary particles have an average diameter of less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm.

In some embodiments, the coated ion exchange particle has an average diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 1,000 μm, less than about 10,000 μm, less than about 100,000 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 1,000 μm, more than about 10,000 μm, from about 1 μm to about 10,000 μm, from about 1 μm to about 1,000 μm, from about 1 μm to about 100 μm, from about 1 μm to about 80 μm, from about 1 μm to about 60 μm, from about 1 μm to about 40 μm, or from about 1 μm to about 20 μm. In some embodiments, the coated ion exchange particles have an average size of less than about 100 μm, less than about 1,000 μm, or less than about 10,000 μm. In some embodiments, the coated ion exchange particles are secondary particles comprised of smaller primary particles, wherein the secondary particles have an average diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 1,000 μm, less than about 10,000 μm, less than about 100,000 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 1,000 μm, more than about 10,000 μm, from about 1 μm to about 10,000 μm, from about 1 μm to about 1,000 μm, from about 1 μm to about 100 μm, from about 1 μm to about 80 μm, from about 1 μm to about 60 μm, from about 1 μm to about 40 μm, or from about 1 μm to about 20 μm.

In an embodiment, the average diameter of the coated ion exchange particles or the average diameter of coated ion exchange particles which are secondary particles comprised of smaller primary particles, is determined by measuring the particle size distribution of the coated ion exchange particles or the coated ion exchange particles which are secondary particles comprised of smaller primary particles, and determining the mean particle size.

In some embodiments, coated ion exchange particles comprise coating on primary ion exchange particles or secondary ion exchange particles. In some embodiments, coated ion exchange particles comprise the coating on primary ion exchange particles and secondary ion exchange particles. In some embodiments, the secondary ion exchange particles comprise primary ion exchange particles. In some embodiments, the coating is on the primary ion exchange particles which are a component of the secondary ion exchange particles and a further coating is applied on the secondary ion exchange particles. In some embodiments, the primary ion exchange particles have a first coating and the secondary ion exchange particles have a second coating that is identical, similar, or different in composition to the first coating.

Porous Structure

In an aspect described herein, coated ion exchange particles, uncoated ion exchange particles, and combinations thereof are optionally embedded in, adhered to, or otherwise supported by a structural support.

Structural Supports of Porous Structure

In some embodiments, the structural support comprises a polymer, an oxide, a phosphate, or combinations thereof. In some embodiments, the structural support comprises polyvinylidene difluoride, polyvinyl chloride, polyvinyl dichloride, a chloro-polymer, a fluoro-polymer, a fluorochloropolymer, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, polyacrylonitrile, polyacrylonitrile, tetrafluoroethylene, perfluoro-3,6-dioxa-4-methyl-7-octene-sulfonic acid (NAFION® (copolymer of perfluoro-3,6-dioxa-4-methyl-7octene-sulfonic acid and tetrafluoroethylene)), copolymers thereof, and combinations thereof. In some embodiments, a structural support is selected from: polyvinylidene difluoride, polyvinyl chloride, sulfonated polytetrofluoroethylene, polystyrene, polydivinylbenzene, copolymers thereof, or combinations thereof. In some embodiments, a structural support is selected from: titanium dioxide, zirconium dioxide, silicon dioxide, solid solutions thereof, or combinations thereof. In some embodiments, the structural support is selected for thermal resistance, acid resistance, and/or other chemical resistance.

In some embodiments, the structural support is used with the coated ion exchange particles, uncoated ion exchange particles, and combinations thereof in a mass ratio of polymer to particles that is about 1:100, about 1:20, about 1:5, about 1:1, about 5:1, about 20:1, from 1:100 to about 20:1, from 1:20 to 20:1, from 1:5 to 20:1, from 1:1 to 20:1, from 5:1 to 20:1, from 1:1 to 1:20, from 1:1 to 1:15, or from 1:1 to 1:10.

In some embodiments, the structural support is a polymer that is dissolved and mixed with the coated ion exchange particles, the uncoated ion exchange particles and combinations thereof, using a solvent selected from N-methyl-2-pyrrolidone, dimethyl sulfoxide, tetrahydrofuran, dimethylformamide, dimethylacetamide, methyl ethyl ketone, and combinations thereof.

Shape of Pores in Porous Structure

In some embodiments, the porous structure has a connected network of pores that enable liquid solutions to penetrate quickly into the porous structure and deliver lithium ion and hydrogen ions to and from the coated ion exchange particles, uncoated ion exchange particles, and combinations thereof. In some embodiments, the porous structure has a connected network of pores that are structured to enable fast infiltration by liquid solutions to create liquid diffusion channels from the porous structure surface to the coated ion exchange particles, uncoated ion exchange particles, and combinations thereof.

In some embodiments, the porous structure has a hierarchical connected network of pores with a distribution of pore sizes such that the pore network creates pathways between the surface of the porous structure and the coated ion exchange particles, uncoated ion exchange particles, and combinations thereof in the porous structure. In some embodiments, the hierarchical connected network of pores comprises large channels from which medium channels branch from and/or medium channels from which small channels branch from. In some embodiments, the hierarchical connected network of pores comprises small channels converging to medium channels and/or medium channels converging to large channels. In some embodiments, the hierarchical connected network of pores creates fast penetration of liquid solutions into the pores. In some embodiments, the hierarchical connected network of pores creates fast diffusion of lithium ions and protons through the pores from the surface of the porous structure to the coated ion exchange particles, uncoated ion exchange particles, and combinations thereof in the porous structure.

Size of Pores in Porous Structure

In some embodiments, the porous structure includes pores with diameters ranging from less than 10 µm to greater than 50 µm. In some embodiments, the porous structure includes pores with diameters of less than about 1 µm, less than about 2 µm, less than about 3 µm, less than about 4 µm, less than about 5 µm, less than about 6 µm, less than about 7 µm, less than about 8 µm, less than about 9 µm, less than about 10 µm, less than about 20 µm, less than about 30 µm, or less than about 40 µm. In some embodiments, the porous structure includes pores with diameters of more than about 10 µm, more than about 20 µm, more than about 30 µm, more than about 40 µm, more than about 50 µm, more than about 60 µm, more than about 70 µm, more than about 80 µm, more than about 90 µm, or more than about 100 µm. In some embodiments, the porous structure includes pores with diameters from about 1 µm to about 100 µm, from about 5 µm to about 90 µm, from about 10 µm to about 80 µm, from about 20 µm to about 70 µm, or from about 30 µm to about 60 µm.

Forms of Porous Structures

In some embodiments, coated ion exchange particles, uncoated ion exchange particles, and combinations thereof are embedded in a support structure, which is a membrane, a spiral-wound membrane, a hollow fiber membrane, or a mesh. In some embodiments, the coated ion exchange particles, uncoated ion exchange particles, and combinations thereof are embedded on a support structure comprised of a polymer, a ceramic, or combinations thereof. In some embodiments, the porous structure is loaded directly into a column with no additional support structure.

Figure 2:
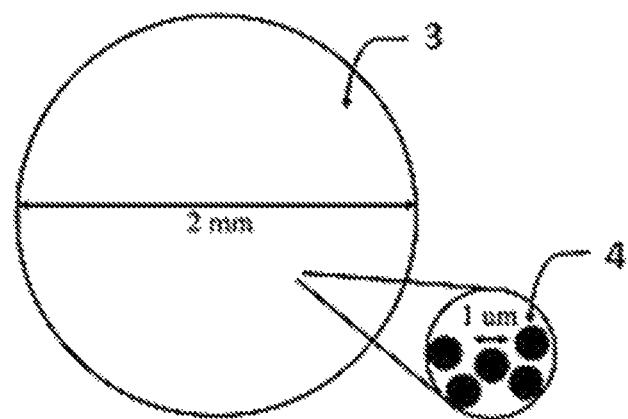
FIG. 2 depicts a porous polymer bead 3 supporting coated ion exchange particle(s) 4.

In some embodiments, the structural support takes the form of a porous membrane, porous bead, other porous structure, dense membrane, dense bead, scaffold, or combinations thereof. In some embodiments, the structural support takes the form of a porous membrane, porous bead, or combinations thereof. One example of a structural support is a porous bead, shown in FIG. 2.

In some embodiments, the structural support is a bead with an average diameter less than about 10 µm, less than about 100 µm, less than about 1 mm, less than about 1 cm, or less than about 10 cm, more than more than 10 µm, more than 100 µm, more than 1 mm, more than 1 cm, from about 1 µm to about 10 cm, from about 10 µm to about 1 cm, from about 100 µm to about 1 cm, from about 1 mm to about 1 cm, from about 0.5 mm to about 1 cm, from about 0.25 mm to about 1 cm, from about 0.25 mm to about 100 mm, from about 0.25 mm to about 75 mm, from about 0.25 mm to about 50 mm, from about 0.25 mm to about 25 mm, from about 0.25 mm to about 10 mm, or from about 10 mm to about 1 cm. In some embodiments, the structural support is a bead with an average diameter less than about 100 µm, less than about 1 mm, less than 1 cm, less than 2 cm, less than 3 cm, less than 4 cm, less than 5 cm, less than 6 cm, less than 7 cm, less than 8 cm, less than 9 cm, or less than about 10 cm. In some embodiments, the structural support is a membrane with an average thickness less than about 10 μm, less than about 100 μm, less than about 1 cm, less than about 10 cm, more than 1 μm, more than 10 μm, more than 100 μm, more than 1 cm, from about 1 μm to about 100 μm, or from about 1 cm to about 10 cm.

Coated Ion Exchange Particles in Porous Structure

In some embodiments are coated ion exchange particles which are a component of a porous structure, wherein the coated ion exchange particles comprise ion exchange material and coating material.

Coating Material of Coated on Exchange Particles in Porous Structure

In some embodiments, the coating material prevents the dissolution of the ion exchange material. In some embodiments, the coating material protects the ion exchange material from dissolution and degradation during lithium elution in acid, during lithium uptake from a liquid resource, and during other embodiments of an ion exchange process. In some embodiments, the coating material enables the use of concentrated acids in the ion exchange process to: (1) yield concentrated lithium ion solutions; (2) shift the equilibrium such that lithium ions move from the ion exchange material; and (3) maximize ion exchange capacity of the ion exchange material.

In some embodiments, the coating material allows diffusion to and from the ion exchange material. In some embodiments, the coating material facilitates diffusion of lithium ions and hydrogen ions between the coated ion exchange particles and various liquid resources. In some embodiments, the coating material enables the adherence of coated ion exchange particles to the structural support and suppresses structural and mechanical degradation of the coated ion exchange particles.

In some embodiments, the coating material comprises a carbide, a nitride, an oxide, a phosphate, a fluoride, a polymer, carbon, a carbonaceous material, or combinations thereof. In some embodiments, the coating material comprises $Nb_2O_5$, $Ta_2O_5$, $MoO_2$, $TiO_2$, $ZrO_2$, $MoO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, the coating material comprises polyvinylidene difluoride, polyvinyl chloride, a fluoro-polymer, a chloro-polymer, or a fluoro-chloro-polymer. In some embodiments, the coating material comprises $TiO_2$, $ZrO_2$, $SiO_2$ $MoO_2$, $Li_2TiO_3$, $Li_2ZrO_3$, $Li_2MnO_3$, $ZrSiO_4$, or $LiNbO_3$, $AlF_3$, SiC, $Si_3N_4$, graphitic carbon, amorphous carbon, diamond-like carbon, or combinations thereof. In some embodiments, the coating material comprises $TiO_2$, $SiO_2$, or $ZrO_2$. In some embodiments, the coating material comprises $TiO_2$. In some embodiments, the coating material comprises $SiO_2$. In some embodiments, the coating material comprises $ZrO_2$.

In some embodiments, the coating coats primary ion exchange particles or secondary ion exchange particles. In some embodiments, the coating coats both the primary ion exchange particles and the secondary ion exchange particles. In some embodiments, the primary ion exchange particles have a first coating and the secondary ion exchange particles have a second coating that is identical, similar, or different in composition to the first coating.

In some embodiments, the coating material has a thickness of less than 1 nm, less than 10 nm, less than 100 nm, less than 1,000 nm, less than 10,000 nm, more than 1 nm, more than 10 nm, more than 100 nm, more than 1,000 nm, more than 10,000 nm, from about 1 nm to about 10,000 nm, from about 10 nm, to about 1,000 nm, or from about 100 to about 1,000 nm. In some embodiments, the coating material has a thickness of less than 5 nm, less than 10 nm, less than 50 nm, less than 100 nm, less than 500 nm, more than 1 nm, more than 5 nm, more than 10 nm, more than 50 nm, more than 100 nm, from about 1 nm to about 500 nm, from about 1 nm to about 100 nm, from about 1 nm to about 50 nm, from about 1 nm to about 10 nm, from about 1 nm to about 5 nm, or from about 5 nm to about 100 nm.

In some embodiments, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In some embodiments, the coating material is deposited by a method such as chemical vapor deposition, hydrothermal, solvothermal, sol-gel, precipitation, microwave sol-gel, chemical precipitation, or combinations thereof. In some embodiments, the coating materials are deposited in a reactor that is a batch tank reactor, a continuous tank reactor, a batch furnace, a continuous furnace, a tube furnace, a rotary tube furnace, or combinations thereof.

In some embodiments, the coating material is deposited in a reactor by suspending the ion exchange material in a solvent with reagents that is added all at once or added over time. In some embodiments, the reagents are added in a specific time series to control reaction rates and coating depositions. In some embodiments, the solvent is aqueous or non-aqueous. In some embodiments, the solvent is an alcohol such as ethanol, propanol, butanol, pentanol, hexanol, septanol, or octanol. In some embodiments, the reagents include metal chlorides, metal oxides, metal alkoxides, metal oxychlorides, metalloid oxides, metalloid alkoxides, metalloid chlorides, metalloid oxychlorides, or combinations thereof. In some embodiments, the reagents include monomers, oligomers, polymers, gels, or combinations thereof. In some embodiments, the reagents include water, oxidants, reductants, acids, bases, or combinations thereof. In some embodiments, the reagents be added in the presence of catalysts such as acids, bases, or combinations thereof. In some embodiments, the reagents are added during a time period of less than about 1 minute, less than about 1 hour, less than about 1 day, less than about 1 week, more than 1 minute, more than 1 hour, more than 1 day, from about 1 minute to about 60 minutes, from about 1 hour to about 24 hours, or from about 1 day to about 7 days. In some embodiments, the reagents are dripped into the reactor continuously or at intervals. In some embodiments, multiple reagents are added to the reactor at different rates. In some embodiments, some reagents are combined separately and reacted to form a gel or polymer prior to addition to the reactor.

In some embodiments, the freshly coated ion exchange material is heated to one or more temperatures to age, dry, react, or crystallize the coating. In some embodiments, the freshly coated ion exchange material is heated to a temperature of less than about 100° C., less than about 200° C., less than about 300° C., less than about 400° C., less than about 500° C., less than about 600° C., less than about 700° C., or less than about 800° C. In some embodiments, the freshly coated ion exchange material is heated to a temperature of more than about 100° C., more than about 200° C., more than about 300° C., more than about 400° C., more than about 500° C., more than about 600° C., more than about 700° C., or more than about 800° C. In some embodiments, the freshly coated ion exchange material is heated to a temperature from about 100° C. to about 800° C., from about 200° C. to about 800° C., from about 300° C. to about 700° C., from about 400° C. to about 700° C., from about 500° C. to about 700° C., from about 100° C. to about 300° C., from about 200° C. to about 400° C., from about 300° C. to about 500° C., from about 400° C. to about 600° C., from about 500° C. to about 700° C., or from about 600° C. to about 800° C. In some embodiments, the freshly coated ion exchange material is heated in an atmosphere of air comprising oxygen, nitrogen, hydrogen, argon, or combinations thereof. In some embodiments, the freshly coated ion exchange material is heated for a time period of less than about 1 hour, less than about 2 hours, less than about 4 hours, less than about 8 hours, less than about 24 hours, more than 1 hour, more than 2 hours, more than 4 hours, more than 8 hours, from about 0.5 hours to about 24 hours, from about 0.5 hours to about 8 hours, from about 0.5 hours to about 4 hours, from about 0.5 hours to about 2 hours, or from about 0.5 hours to about 1 hour.

In some embodiments, the coating material is deposited with physical characteristics such as crystalline, amorphous, full coverage, partial coverage, uniform, non-uniform, or combinations thereof. In some embodiments, multiple coatings are deposited on the ion exchange material in an arrangement such as concentric, patchwork, or combinations thereof.

Ion Exchange Material of Coated Ion Exchange Particles in Porous Structure

In some embodiments, the ion exchange material is suitable for high lithium absorption capacity and for lithium ions in a liquid resource relative to other ions such as sodium ions and magnesium ions. In some embodiments, the ion exchange material is suitable for strong lithium ion uptake in liquid resources including those with low concentrations of lithium ions, facile elution of lithium ions with a small excess of acid, and fast ionic diffusion.

In some embodiments, the ion exchange material comprises an oxide, a phosphate, an oxyfluoride, a fluorophosphate, or combinations thereof. In a further embodiment, the ion exchange material comprises $LiFePO_4$, $LiMnPO_4$, $Li_2MO_3$ (M=Ti, Mn, Sn), $Li_4Mn_5O_{12}$, $Li_4Ti_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof. In some embodiment, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y is independently selected from 0.1, 0.2, 0.3, 0.4, 0.5, 0.6, 0.7, 0.8, 0.9, 1, 2, 3, 4, 5, 6, 7, 8, 9, and 10. In some embodiments, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In some embodiments, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In some embodiments, the ion exchange material is synthesized by a method such as chemical precipitation, hydrothermal, solid state, microwave, or combinations thereof.

In some embodiments, the ion exchange materials are synthesized in a lithiated state with a sub-lattice fully or partly occupied by lithium ions. In some embodiments, the ion exchange materials are synthesized in a hydrated state with a sub-lattice fully or partly occupied by hydrogen ions.

In some embodiments, the ion exchange material and the coating material form one or more concentration gradients where the chemical composition of the coated ion exchange particle varies between two or more compositions. In some embodiments, the chemical composition varies between the ion exchange materials and the coating in a manner that is continuous, discontinuous, or continuous and discontinuous in different regions of the coated ion exchange particle. In some embodiments, the ion exchange materials and the coating materials form a concentration gradient that extends over a thickness of less than 1 nm, less than 10 nm, less than 100 nm, less than 1,000nm, less than 10,000 nm, less than 100,000 nm, more than 1 nm, more than 10 nm, more than 100 nm, more than 1,000 nm, more than 10,000 nm, from about 1 nm to about 100,000 nm, from about 10 nm, to about 10,000 nm, or from about 100 to about 1,000 nm.

Particle Size of Coated Ion Exchange Particles In Porous structure

In some embodiments, the coated ion exchange particle has an average diameter of less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm. In some embodiments, the coated ion exchange particles have an average size of less than about 100 nm, less than about 1,000 nm, or less than about 10,000 nm. In some embodiments, the coated ion exchange particles are secondary particles comprised of smaller primary particles, wherein the secondary particles have an average diameter of less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm.

In some embodiments, the coated ion exchange particle has an average diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 1,000 μm, less than about 10,000 μm, less than about 100,000 μm, more than about 10 μm, more than about 20 μm, more than about 30 μm, more than about 40 μm, more than about 50 μm, more than about 60 µm, more than about 70 µm, more than about 80 µm, more than about 90 µm, more than about 100 µm, more than about 1,000 µm, more than about 10,000 µm, from about 1 µm to about 10,000 µm, from about 1 µm to about 1,000 µm, from about 1 µm to about 100 µm, from about 1 µm to about 80 µm, from about 1 µm to about 60 µm, from about 1 µm to about 40 µm, or from about 1 µm to about 20 µm. In some embodiments, the coated ion exchange particles have an average size of less than about 100 µm, less than about 1,000 µm, or less than about 10,000 µm. In some embodiments, the coated ion exchange particles are secondary particles comprised of smaller primary particles, wherein the secondary particles have an average diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 1,000 µm, less than about 10,000 µm, less than about 100,000 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 1,000 µm, more than about 10,000 µm, from about 1 µm to about 10,000 µm, from about 1 µm to about 1,000 µm, from about 1 µm to about 100 µm, from about 1 µm to about 80 µm, from about 1 µm to about 60 µm, from about 1 µm to about 40 µm, or from about 1 µm to about 20

In an embodiment, the average diameter of the coated ion exchange particles or the average diameter of coated ion exchange particles which are secondary particles comprised of smaller primary particles, is determined by measuring the particle size distribution of the coated ion exchange particles or the coated ion exchange particles which are secondary particles comprised of smaller primary particles, and determining the mean particle size.

Uncoated Ion Exchange Particles in Porous Structure

In an aspect described herein, uncoated ion exchange particles are embedded in, adhered to, or otherwise supported by the structural support.

Ion Exchange Material of Uncoated Ion Exchange Particles in Porous Structure

In some embodiments, the ion exchange material is suitable for high lithium absorption capacity and for lithium ions in a liquid resource relative to other ions such as sodium ions and magnesium ions. In some embodiments, the ion exchange material is suitable for strong lithium ion uptake in liquid resources including those with low concentrations of lithium ions, facile elution of lithium ions with a small excess of acid, and fast ionic diffusion.

In some embodiments, the ion exchange material comprises an oxide, a phosphate, an oxyfluoride, a fluorophosphate, or combinations thereof. In a further embodiment, the ion exchange material comprises $LiFePO_4$, $LiMnPO_4$, $Li_2MO_3$ (M=Ti, Mn, Sn), $Li_4Mn_5O_{12}$, $Li_4Ti_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof. In some embodiment, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y is independently selected from 0.1, 0.2, 0.3, 0.4, 0.5, 0.6, 0.7, 0.8, 0.9, 1, 2, 3, 4, 5, 6, 7, 8, 9, and 10. In some embodiments, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In some embodiments, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In some embodiments, the ion exchange material is synthesized by a method such as chemical precipitation, hydrothermal, solid state, microwave, or combinations thereof.

In some embodiments, the ion exchange materials are synthesized in a lithiated state with a sub-lattice fully or partly occupied by lithium ions. In some embodiments, the ion exchange materials are synthesized in a hydrated state with a sub-lattice fully or partly occupied by hydrogen ions.

Particle Size of Uncoated Ion Exchange Particles in Porous Structure

In some embodiments, the uncoated ion exchange particle has an average diameter of less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm. In some embodiments, the uncoated ion exchange particles have an average size of less than about 100 nm, less than about 1,000 nm, or less than about 10,000 nm. In some embodiments, the uncoated ion exchange particles are secondary particles comprised of smaller primary particles, wherein the secondary particles have an average diameter of less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm.

In some embodiments, the uncoated ion exchange particle has an average diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 1,000 µm, less than about 10,000 µm, less than about 100,000 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 1,000 µm, more than about 10,000 µm, from about 1

μm to about 10,000 μm, from about 1 μm to about 1,000 μm, from about 1 μm to about 100 μm, from about 1 μm to about 80 μm, from about 1 μm to about 60 μm, from about 1 μm to about 40 μm, or from about 1 μm to about 20 μm. In some embodiments, the uncoated ion exchange particles have an average size of less than about 100 μm, less than about 1,000 μm, or less than about 10,000 μm. In some embodiments, the uncoated ion exchange particles are secondary particles comprised of smaller primary particles, wherein the secondary particles have an average diameter of less than about 10 μm, less than about 20 μm, less than about 30 μm, less than about 40 μm, less than about 50 μm, less than about 60 μm, less than about 70 μm, less than about 80 μm, less than about 90 μm, less than about 100 μm, less than about 1,000 μm, less than about 10,000 μm, less than about 100,000 μm, more than about 10 μm, more than about 20 μm, more than about 30 μm, more than about 40 μm, more than about 50 μm, more than about 60 μm, more than about 70 μm, more than about 80 μm, more than about 90 μm, more than about 100 μm, more than about 1,000 μm, more than about 10,000 μm, from about 1 μm to about 10,000 μm, from about 1 μm to about 1,000 μm, from about 1 μm to about 100 μm, from about 1 μm to about 80 μm, from about 1 μm to about 60 μm, from about 1 μm to about 40 μm, or from about 1 μm to about 20 μm.

In an embodiment, the average diameter of the uncoated ion exchange particles or the average diameter of the uncoated ion exchange particles which are secondary particles comprised of smaller primary particles, is determined by measuring the particle size distribution of the uncoated ion exchange particles or the uncoated ion exchange particles which are secondary particles comprised of smaller primary particles, and determining the mean particle size.

Porous Beads

In an aspect described herein, the porous structure is in the form of a porous bead.

In some embodiments, the porous bead is formed from dry powder using a mechanical press, a pellet press, a tablet press, a pill press, a rotary press, or combinations thereof. In some embodiments, the porous bead is formed from a solvent slurry by dripping the slurry into a different liquid solution. The solvent slurry is formed using a solvent of N-methyl-2-pyrrolidone, dimethyl sulfoxide, tetrahydrofuran, dimethylformamide, dimethylacetamide, methyl ethyl ketone, or combinations thereof. The different liquid solutions comprise water, ethanol, iso-propyl alcohol, acetone, or combinations thereof.

Spherical Beads

In some embodiments, the porous bead is approximately spherical with an average diameter of less than 10 μm, less than 100 μm, less than 1 mm, less than 1 cm, less than 10 cm, more than 10 μm, more than 100 μm, more than 1 mm, more than 1 cm, from about 1 μm to about 100 μm, from about 1 mm to about 100 mm, from about 1 mm to about 80 mm, from about 1 mm to about 60 mm, from about 1 to about 40 mm, from about 1 to about 20 mm, from about 1 to about 10 mm, from about 1 cm to about 10 cm, from about 1 cm to about 8 cm, from about 1 cm to about 6 cm, or from about 1 cm to about 4 cm. In some embodiments, the porous bead is approximately spherical with an average diameter of less than 200 μm, less than 2 mm, less than 20 mm, more than 200 μm, more than 2 mm, more than 20 mm, from about 1 μ to about 100 μm, from about 1 μm to about 200 μm, from about 1 μm to about 2 mm, from about 1 μm to about 20 mm, or from about 2 mm to about 200 mm.

Tablet-shaped Beads

In some embodiments, the porous bead is tablet-shaped with a diameter of less than 1 mm, less than 2 mm, less than 4 mm, less than 8 mm, less than 20 mm, more than 1 mm, more than 2 mm, more than 4 mm, more than 8 mm, from about 0.5 mm to about 1 mm, from about 0.5 mm to about 2 mm, from about 1 mm to about 4 mm, from about 1 mm to about 8 mm, from about 1 mm to about 20 mm, and with a height of less than 1 mm, less than 2 mm, less than 4 mm, less than 8 mm, less than 20 mm, more than 1 mm, more than 2 mm, more than 4 mm, more than 8 mm, from about 0.5 mm to about 1 mm, from about 0.5 mm to about 2 mm, from about 1 mm to about 4 mm, from about 1 mm to about 8 mm, from about 1 mm to about 20 mm. In some embodiments, the porous bead has a diameter of less than 8 mm and a height of less than 8 mm. In some embodiments, the porous bead has a diameter of less than 4 mm and a height of less than 4 mm. In some embodiments, the porous bead has a diameter of less than 2 mm and a height of less than 2 mm. In some embodiments, the porous bead has a diameter of less than 1 mm and a height of less than 1 mm.

Methods

Methods Using Coated Ion Exchange Particles

In an aspect described herein are methods of extracting lithium from a liquid resource, comprising contacting the coated ion exchange particles with a liquid resource to produce lithiated coated ion exchange particles; and treating the lithiated coated ion exchange particles with an acid solution to produce a salt solution comprising lithium ions. Here, the coated ion exchange particles are optionally mixed with a liquid resource to absorb lithium and then recovered through filtration, gravimetric separation, or other means.

In some embodiments, the liquid resource is a natural brine, a dissolved salt flat, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, water from an oilfield, effluent from a chemical process, or combinations thereof. In some embodiments, a liquid resource is a natural brine, a dissolved salt flat, a concentrated brine, water from an oilfield, a processed brine, a synthetic brine, liquid from an ion exchange process, liquid from a solvent extraction process, leachate from minerals, leachate from clays, leachate from recycled products, leachate from recycled materials, or combinations thereof. In some embodiments, the pH of the brine is adjusted before or after ion exchange to neutralize acidic protons released by the ion exchange material during lithium uptake.

In some embodiments, the liquid resource has a lithium ion concentration of less than about 100,000 ppm, less than about 10,000 ppm, less than about 1,000 ppm, less than about 100 ppm, less than about 10 ppm, or combinations thereof. In some embodiments, the liquid resource has a lithium ion concentration less than about 5,000 ppm, less than about 500 ppm, less than about 50 ppm, or combinations thereof. In some embodiments, the liquid resource has sodium ion, calcium ion, magnesium ion, potassium ion, or strontium ion concentrations greater than about 100 ppm, greater than about 1,000 ppm, greater than about 10,000 ppm, or greater than about 100,000 ppm. In some embodiments, the liquid resource has hydrocarbon, hydrogen sulfide, surfactant, or microbe concentrations greater than about 1 ppb, 1 ppm, 10 ppm, 100 ppm, 1,000 ppm, or 10,000 ppm. In some embodiments, the liquid resource has suspended solids at a concentration of greater than about 1 ppb, 1 ppm, 10 ppm, 100 ppm, or 1,000 ppm.

In some embodiments, the acid solution used for recovering lithium ions from the coated ion exchange particles is prepared with hydrochloric acid, sulfuric acid, phosphoric acid, hydrobromic acid, chloric acid, perchloric acid, nitric acid, formic acid, acetic acid, or combinations thereof. In some embodiments, the acid solution is prepared with hydrochloric acid, sulfuric acid, nitric phosphoric acid, or combinations thereof. In some embodiments, the acid solution has an acid concentration greater than about 0.1 M, greater than about 0.5 M, greater than about 1 M, greater than about 5 M, or greater than about 10 M, or combinations thereof. In some embodiments, the acid solution has an acid concentration lesser than about 0.1 M, lesser than about 0.5 M, lesser than about 1 M, lesser than about 5 M, or lesser than about 10 M, or combinations thereof. In some embodiments, the acid solution has an acid concentration from about 0.1 M to about 10 M, from about 0.5 M to about 5 M, or from about 0.5 M to about 1 M. In some embodiments, the acid solution has a pH less than about 4, less than about 2, less than about 1, or less than about 0. In some embodiments, the acid solution has a pH that increases over time as the acid solution is exposed to the coated ion exchange particles and the coated ion exchange particles absorb protons while releasing lithium ions.

In some embodiments, the coated ion exchange particles perform the ion exchange reaction repeatedly over a number of cycles greater than about 10 cycles, greater than about 30 cycles, greater than about 100 cycles, or greater than about 300 cycles. In some embodiments, the coated ion exchange particles are used until their lithium uptake capacity drops by greater than about 5%, greater than about 10%, greater than about 20%, greater than about 40%, or greater than about 60% below their initial lithium uptake capacity. In some embodiments, the coated ion exchange particles are used until their lithium uptake capacity drops by lesser than about 5%, lesser than about 10%, lesser than about 20%, lesser than about 40%, or lesser than about 60% below their initial lithium uptake capacity.

In some embodiments, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $SiO_2$ $MoO_2$, $ZrSiO_4$, $Li_2TiO_3$, $Li_2ZrO_3$, $LiNbO_3$, $AlF_3$, $SiC$, $Si_3N_4$, graphitic carbon, amorphous carbon, diamond-like carbon, or combinations thereof. The coated ion exchange particles have an average diameter less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm, and the coating thickness is less than 1 nm, less than 10 nm, less than 100 nm, less than 1,000 nm, less than 10,000 nm, more than 1 nm, more than 10 nm, more than 100 nm, more than 1,000 nm, more than 10,000 nm, from about 1 nm to about 10,000 nm, from about 10 nm, to about 1,000 nm, or from about 100 to about 1,000nm. In some embodiments, the coating material has a thickness of less than 5 nm, less than 10 nm, less than 50 nm, less than 100 nm, less than 500 nm, more than 1 nm, more than 5 nm, more than 10 nm, more than 50 nm, more than 100 nm, from about 1 nm to about 500 nm, from about 1 nm to about 100 nm, from about 1 nm to about 50 nm, from about 1 nm to about 10 nm, from about 1 nm to about 5 nm, or from about 5 nm to about 100 nm. The coated ion exchange particles are created by synthesizing the ion exchange material using a method such as hydrothermal, solid state, microwave, or combinations thereof. The coating material is deposited on the surface of the ion exchange material using a method such as chemical vapor deposition, hydrothermal, solvothermal, sol-gel, precipitation, microwave or by suspending the ion exchange material in a solvent and then adding reagents including metal chloride, metal oxychloride, metal alkoxide, water, acid, base, or combinations thereof. The coated ion exchange particles are treated with an acid solution prepared with hydrochloric acid, sulfuric acid, nitric acid, or combinations thereof wherein the concentration of the acid solution is greater than about 0.1 M, greater than about 0.5 M, greater than about 2 M, greater than about 5 M, or combinations thereof. During acid treatment, the coated ion exchange particles absorb hydrogen ions while releasing lithium ions. The ion exchange material is converted to a protonated state. The coating material allows diffusion of hydrogen ions and lithium ions respectively to and from the ion exchange material while providing a protective barrier that limits dissolution of the ion exchange material. After treatment in acid, the protonated coated ion exchange particles are treated with a liquid resource wherein the liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof. The coated ion exchange particles absorb lithium ions while releasing hydrogen ions. After acid treatment, the lithium salt solution is collected and processed into lithium carbonate, lithium hydroxide, or lithium phosphate.

Methods Using Porous Structure

In an aspect described herein are methods of extracting lithium from a liquid resource, comprising contacting the porous structure with a liquid resource to produce a lithiated porous structure, and treating the lithiated porous structure with an acid solution to produce a salt solution comprising lithium ions.

In some embodiments, the liquid resource is a natural brine, a dissolved salt flat, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, water from an oilfield, effluent from a chemical process, or combinations thereof. In some embodiments, a liquid resource is a natural brine, a dissolved salt flat, a concentrated brine, water from an oilfield, a processed brine, a synthetic brine, liquid from an ion exchange process, liquid from a solvent extraction process, leachate from minerals, leachate from clays, leachate from recycled products, leachate from recycled materials, or combinations thereof. In some embodiments, the pH of the brine is adjusted before or after ion exchange to neutralize acidic protons released during lithium uptake.

In some embodiments, the liquid resource has a lithium ion concentration of less than about 100,000 ppm, less than about 10,000 ppm, less than about 1,000 ppm, less than about 100 ppm, less than about 10 ppm, or combinations thereof. In some embodiments, the liquid resource has a lithium ion concentration less than about 5,000 ppm, less than about 500 ppm, less than about 50 ppm, or combinations thereof. In some embodiments, the liquid resource has sodium ion, calcium ion, magnesium ion, potassium ion, or strontium ion concentrations greater than about 100 ppm, greater than about 1,000 ppm, greater than about 10,000 ppm, or greater than about 100,000 ppm. In some embodiments, the liquid resource has hydrocarbon, hydrogen sulfide, surfactant, or microbe concentrations greater than about 1 ppb, 1 ppm, 10 ppm, 100 ppm, 1,000 ppm, or 10,000 ppm. In some embodiments, the liquid resource has suspended solids at a concentration of greater than about 1 ppb, 1 ppm, 10 ppm, 100 ppm, or 1,000 ppm.

In some embodiments, the acid solution used for recovering lithium ions from the porous structure is prepared with hydrochloric acid, sulfuric acid, phosphoric acid, hydrobromic acid, chloric acid, perchloric acid, nitric acid, formic acid, acetic acid, or combinations thereof. In some embodiments, the acid solution is prepared with hydrochloric acid, sulfuric acid, nitric phosphoric acid, or combinations thereof. In some embodiments, the acid solution has an acid concentration greater than about 0.1 M, greater than about 0.5 M, greater than about 1 M, greater than about 5 M, or greater than about 10 M, or combinations thereof. In some embodiments, the acid solution has an acid concentration lesser than about 0.1 M, lesser than about 0.5 M, lesser than about 1 M, lesser than about 5 M, or lesser than about 10 M, or combinations thereof. In some embodiments, the acid solution has an acid concentration from about 0.1 M to about 10 M, from about 0.5 M to about 5 M, or from about 0.5 M to about 1 M. In some embodiments, the acid solution has a pH less than about 4, less than about 2, less than about 1, or less than about 0. In some embodiments, the acid solution has a pH that increases over time as the acid solution is exposed to the porous structure and the porous structure absorbs protons while releasing lithium ions.

In some embodiments, the porous structure performs the ion exchange reaction repeatedly over a number of cycles greater than 10 cycles, greater than 30 cycles, greater than 100 cycles, greater than 300 cycles, or greater than 1,000 cycles. In some embodiments, the porous structure performs the ion exchange reaction repeatedly over a number of cycles greater than 50 cycles, greater than 100 cycles, or greater than 200 cycles.

In some embodiments, the coated ion exchange particles, the uncoated ion exchange particles, and combinations thereof in the porous structure perform the ion exchange reaction repeatedly over a number of cycles greater than about 10 cycles, greater than about 30 cycles, greater than about 100 cycles, or greater than about 300 cycles. In some embodiments, the coated ion exchange particles, the uncoated ion exchange particles, and combinations thereof in the porous bead are used until lithium uptake capacity drops by greater than about 5%, greater than about 10%, greater than about 20%, greater than about 40%, or greater than about 60% below their initial lithium uptake capacity. In some embodiments, the coated ion exchange particles are used until their lithium uptake capacity drops by lesser than about 5%, lesser than about 10%, lesser than about 20%, lesser than about 40%, or lesser than about 60% below their initial lithium uptake capacity.

In some embodiments, the coated ion exchange particles of the porous structure are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $SiO_2$ $MoO_2$, $ZrSiO_4$, $Li_2TiO_3$, $Li_2ZrO_3$, $LiNbO_3$, $AlF_3$, SiC, $Si_3N_4$, graphitic carbon, amorphous carbon, diamond-like carbon-carbon, or combinations thereof. The coated ion exchange particles of the porous structure have an average diameter less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm, and the coating thickness is less than 1 nm, less than 10 nm, less than 100 nm, less than 1,000 nm, less than 10,000 nm, more than 1 nm, more than 10 nm, more than 100 nm, more than 1,000 nm, more than 10,000 nm, from about 1 nm to about 10,000 nm, from about 10 nm, to about 1,000 nm, or from about 100 to about 1,000 nm. In some embodiments, the coating material has a thickness of less than 5 nm, less than 10 nm, less than 50 nm, less than 100 nm, less than 500 nm, more than 1 nm, more than 5 nm, more than 10 nm, more than 50 nm, more than 100 nm, from about 1 nm to about 500 nm, from about 1 nm to about 100 nm, from about 1 nm to about 50 nm, from about 1 nm to about 10 nm, from about 1 nm to about 5 nm, or from about 5 nm to about 100 nm. The coated ion exchange particles of the porous structure are created by first synthesizing the ion exchange material using a method such as hydrothermal, solid state, microwave, or combinations thereof. The coating material is deposited on the surface of the ion exchange material using a method such as chemical vapor deposition, hydrothermal, solvothermal, sol-gel, precipitation, or microwave by suspending the ion exchange material in a solvent and then adding reagents including metal chloride, metal oxychloride, metal alkoxide, water, acid, base, or combinations thereof. The coated ion exchange particles of the porous structure is treated with an acid solution prepared with hydrochloric acid, sulfuric acid, nitric acid, or combinations thereof wherein the concentration of the acid solution is greater than about 0.1 M, greater than about 0.5 M, greater than about 2 M, greater than about 5 M, or combinations thereof. During acid treatment, the coated ion exchange particles of the porous structure absorb hydrogen ions while releasing lithium ions. The ion exchange material is converted to a protonated state. The coating material allows diffusion of hydrogen ions and lithium ions respectively to and from the ion exchange material while providing a protective barrier that limits dissolution of the ion exchange material. After treatment in acid, the protonated coated ion exchange particles of the porous structure are treated with a liquid resource wherein the liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof. The coated ion exchange particles of the porous structure absorb lithium ions while releasing hydrogen ions. After acid treatment, the lithium salt solution is collected and processed into lithium carbonate, lithium hydroxide, or lithium phosphate.

In an embodiment, the uncoated ion exchange particles of the porous structure are comprised of an ion exchange material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof. The uncoated ion exchange particles of the porous structure have an average diameter less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm. The uncoated ion exchange particles of the porous structure are created by synthesizing the ion exchange material using a method such as hydrothermal, solid state, microwave, or combinations thereof. The uncoated ion exchange particles of the porous structure is treated with an acid solution prepared with hydrochloric acid, sulfuric acid, nitric acid, or combinations thereof wherein the concentration of the acid solution is greater than about 0.1 M, greater than about 0.5 M, greater than about 2 M, greater than about 5 M, or combinations thereof. During acid treatment, the uncoated ion exchange particles of the porous structure absorb hydrogen ions while releasing lithium ions. The ion exchange material is converted to a protonated state. After treatment in acid, the protonated uncoated ion exchange particles are treated with a liquid resource wherein the liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof. The uncoated ion exchange particles absorb lithium ions while releasing hydrogen ions. After acid treatment, the lithium salt solution is collected and processed into lithium carbonate, lithium hydroxide, or lithium phosphate.

In an embodiment, there is a combination of coated ion exchange particles and uncoated ion exchange particles in the porous structure. The combination of coated ion exchange particles and uncoated ion exchange particles in the porous structure is treated with an acid solution prepared with hydrochloric acid, sulfuric acid, nitric acid, or combinations thereof wherein the concentration of the acid solution is greater than about 0.1 M, greater than about 0.5 M, greater than about 2 M, greater than about 5 M, lesser than about 0.1 M, lesser than about 0.5 M, lesser than about 1 M, lesser than about 5 M, or lesser than about 10 M, from about 0.1 M to about 10 M, from about 0.5 M to about 5 M, or from about 0.5 M to about 1 M, or combinations thereof. During acid treatment, the combination of coated ion exchange particles and uncoated ion exchange particles in the porous structure absorb hydrogen ions while releasing lithium ions. The ion exchange material is converted to a protonated state. After treatment in acid, the combination of protonated coated ion exchange particles and protonated uncoated ion exchange particles are treated with a liquid resource wherein the liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof. The combination of protonated coated ion exchange particles and protonated uncoated ion exchange particles in the porous structure absorb lithium ions while releasing hydrogen ions. After acid treatment, the lithium salt solution is collected and processed into lithium carbonate, lithium hydroxide, or lithium phosphate.

Methods Using Porous Beads

In an aspect described herein are methods of extracting lithium from a liquid resource, comprising contacting the porous bead with a liquid resource to produce lithiated porous beads; and treating the lithiated porous beads with an acid solution to produce a salt solution comprising lithium ions.

In some embodiments, the liquid resource is a natural brine, a dissolved salt flat, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, water from an oilfield, effluent from a chemical process, or combinations thereof. In some embodiments, a liquid resource is a natural brine, a dissolved salt flat, a concentrated brine, water from an oilfield, a processed brine, a synthetic brine, liquid from an ion exchange process, liquid from a solvent extraction process, leachate from minerals, leachate from clays, leachate from recycled products, leachate from recycled materials, or combinations thereof. In some embodiments, the pH of the brine is adjusted before or after ion exchange to neutralize acidic protons released during lithium uptake.

In some embodiments, the liquid resource has a lithium ion concentration of less than about 100,000 ppm, less than about 10,000 ppm, less than about 1,000 ppm, less than about 100 ppm, less than about 10 ppm, or combinations thereof. In some embodiments, the liquid resource has a lithium ion concentration less than about 5,000 ppm, less than about 500 ppm, less than about 50 ppm, or combinations thereof. In some embodiments, the liquid resource has sodium ion, calcium ion, magnesium ion, potassium ion, or strontium ion concentrations greater than about 100 ppm, greater than about 1,000 ppm, greater than about 10,000 ppm, or greater than about 100,000 ppm. In some embodiments, the liquid resource has hydrocarbon, hydrogen sulfide, surfactant, or microbe concentrations greater than about 1 ppb, 1 ppm, 10 ppm, 100 ppm, 1,000 ppm, or 10,000 ppm. In some embodiments, the liquid resource has suspended solids at a concentration of greater than about 1 ppb, 1 ppm, 10 ppm, 100 ppm, or 1,000 ppm.

In some embodiments, the acid solution used for recovering lithium ions from the porous beads are prepared with hydrochloric acid, sulfuric acid, phosphoric acid, hydrobromic acid, chloric acid, perchloric acid, nitric acid, formic acid, acetic acid, or combinations thereof. In some embodiments, the acid solution is prepared with hydrochloric acid, sulfuric acid, nitric phosphoric acid, or combinations thereof. In some embodiments, the acid solution has an acid concentration greater than about 0.1 M, greater than about 0.5 M, greater than about 1 M, greater than about 5 M, or greater than about 10 M, or combinations thereof. In some embodiments, the acid solution has an acid concentration lesser than about 0.1 M, lesser than about 0.5 M, lesser than about 1 M, lesser than about 5 M, or lesser than about 10 M, or combinations thereof. In some embodiments, the acid solution has an acid concentration from about 0.1 M to about 10 M, from about 0.5 M to about 5 M, or from about 0.5 M to about 1 M. In some embodiments, the acid solution has a pH less than about 4, less than about 2, less than about 1, or less than about 0. In some embodiments, the acid solution has a pH that increases over time as the acid solution is exposed to the porous beads and the porous beads absorb protons while releasing lithium ions.

In some embodiments, the porous bead performs the ion exchange reaction repeatedly over a number of cycles greater than 10 cycles, greater than 30 cycles, greater than 100 cycles, greater than 300 cycles, or greater than 1,000 cycles. In some embodiments, the porous bead performs the ion exchange reaction repeatedly over a number of cycles greater than 50 cycles, greater than 100 cycles, or greater than 200 cycles.

In some embodiments, the coated ion exchange particles, the uncoated ion exchange particles, and combinations thereof in the porous bead perform the ion exchange reaction repeatedly over a number of cycles greater than about 10 cycles, greater than about 30 cycles, greater than about 100 cycles, or greater than about 300 cycles. In some embodiments, the coated ion exchange particles, the uncoated ion exchange particles, and combinations thereof in the porous bead are used until lithium uptake capacity drops by greater than about 5%, greater than about 10%, greater than about 20%, greater than about 40%, or greater than about 60% below their initial lithium uptake capacity. In some embodiments, the coated ion exchange particles are used until their lithium uptake capacity drops by lesser than about 5%, lesser than about 10%, lesser than about 20%, lesser than about 40%, or lesser than about 60% below their initial lithium uptake capacity.

In some embodiments, the coated ion exchange particles of the porous bead are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $SiO_2$ $MoO_2$, $ZrSiO_4$, $Li_2TiO_3$, $Li_2ZrO_3$, $LiNbO_3$, $AlF_3$, SiC, $Si_3N_4$, graphitic carbon, amorphous carbon, diamond-like carbon-carbon, or combinations thereof. The coated ion exchange particles of the porous bead have an average diameter less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm, and the coating thickness is less than 5 nm, less than 10 nm, less than 50 nm, less than 100 nm, less than 500 nm, more than 1 nm, more than 5 nm, more than 10 nm, more than 50 nm, more than 100 nm, from about 1 nm to about 500 nm, from about 1 nm to about 100 nm, from about 1 nm to about 50 nm, from about 1 nm to about 10 nm, from about 1 nm to about 5 nm, or from about 5 nm to about 100 nm. The coated ion exchange particles of the porous bead are created by first synthesizing the ion exchange material using a method such as hydrothermal, solid state, microwave, or combinations thereof. The coating material is deposited on the surface of the ion exchange material using a method such as chemical vapor deposition, hydrothermal, solvothermal, sol-gel, precipitation, or microwave by suspending the ion exchange material in a solvent and then adding reagents including metal chloride, metal oxychloride, metal alkoxide, water, acid, base, or combinations thereof. The coated ion exchange particles of the porous bead is treated with an acid solution prepared with hydrochloric acid, sulfuric acid, nitric acid, or combinations thereof wherein the concentration of the acid solution is greater than about 0.1 M, greater than about 0.5 M, greater than about 2 M, greater than about 5 M, or combinations thereof. During acid treatment, the coated ion exchange particles of the porous bead absorb hydrogen ions while releasing lithium ions. The ion exchange material is converted to a protonated state. The coating material allows diffusion of hydrogen ions and lithium ions respectively to and from the ion exchange material while providing a protective barrier that limits dissolution of the ion exchange material. After treatment in acid, the protonated coated ion exchange particles of the porous bead are treated with a liquid resource wherein the liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof. The coated ion exchange particles of the porous bead absorb lithium ions while releasing hydrogen ions. After acid treatment, the lithium salt solution is collected and processed into lithium carbonate, lithium hydroxide, or lithium phosphate.

In some embodiments, the uncoated ion exchange particles of the porous bead are comprised of an ion exchange material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof. The uncoated ion exchange particles of the porous bead has an average diameter less than about 10 nm, less than about 20 nm, less than about 30 nm, less than about 40 nm, less than about 50 nm, less than about 60 nm, less than about 70 nm, less than about 80 nm, less than about 90 nm, less than about 100 nm, less than about 1,000 nm, less than about 10,000 nm, less than about 100,000 nm, more than about 10 nm, more than about 20 nm, more than about 30 nm, more than about 40 nm, more than about 50 nm, more than about 60 nm, more than about 70 nm, more than about 80 nm, more than about 90 nm, more than about 100 nm, more than about 1,000 nm, more than about 10,000 nm, from about 1 nm to about 10,000 nm, from about 1 nm to about 1,000 nm, from about 1 nm to about 100 nm, from about 1 nm to about 80 nm, from about 1 nm to about 60 nm, from about 1 nm to about 40 nm, or from about 1 nm to about 20 nm. The uncoated ion exchange particles of the porous bead are created by synthesizing the ion exchange material using a method such as hydrothermal, solid state, microwave, or combinations thereof. The uncoated ion exchange particles of the porous bead is treated with an acid solution prepared with hydrochloric acid, sulfuric acid, nitric acid, or combinations thereof wherein the concentration of the acid solution is greater than about 0.1 M, greater than about 0.5 M, greater than about 2 M, greater than about 5 M, or combinations thereof. During acid treatment, the uncoated ion exchange particles of the porous bead absorb hydrogen ions while releasing lithium ions. The ion exchange material is converted to a protonated state. After treatment in acid, the protonated uncoated ion exchange particles are treated with a liquid resource wherein the liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof. The uncoated ion exchange particles absorb lithium ions while releasing hydrogen ions. After acid treatment, the lithium salt solution is collected and processed into lithium carbonate, lithium hydroxide, or lithium phosphate.

In some embodiments, there is a combination of coated ion exchange particles and uncoated ion exchange particles in the porous bead. The combination of coated ion exchange particles and uncoated ion exchange particles in the porous bead is treated with an acid solution prepared with hydrochloric acid, sulfuric acid, nitric acid, or combinations thereof wherein the concentration of the acid solution is greater than about 0.1 M, greater than about 0.5 M, greater than about 2 M, greater than about 5 M, or combinations thereof. During acid treatment, the combination of coated ion exchange particles and uncoated ion exchange particles in the porous bead absorb hydrogen ions while releasing lithium ions. The ion exchange material is converted to a protonated state. After treatment in acid, the combination of protonated coated ion exchange particles and protonated uncoated ion exchange particles in the porous bead are treated with a liquid resource wherein the liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof. The combination of protonated coated ion exchange particles and protonated uncoated ion exchange particles in the porous bead absorb lithium ions while releasing hydrogen ions. After acid treatment, the lithium salt solution is collected and processed into lithium carbonate, lithium hydroxide, or lithium phosphate.

Methods Using Coated Ion Exchange Particles, Porous Structure, and/or Porous Beads in a Column In an aspect described herein are methods of extracting lithium from a liquid resource, wherein the methods using coated ion exchange particles, porous structures, and/or porous beads is conducted in a column. The coated ion exchange particles are as hereinbefore described. The porous structures are as hereinbefore described. The porous beads are as hereinbefore described.

Figure 3:
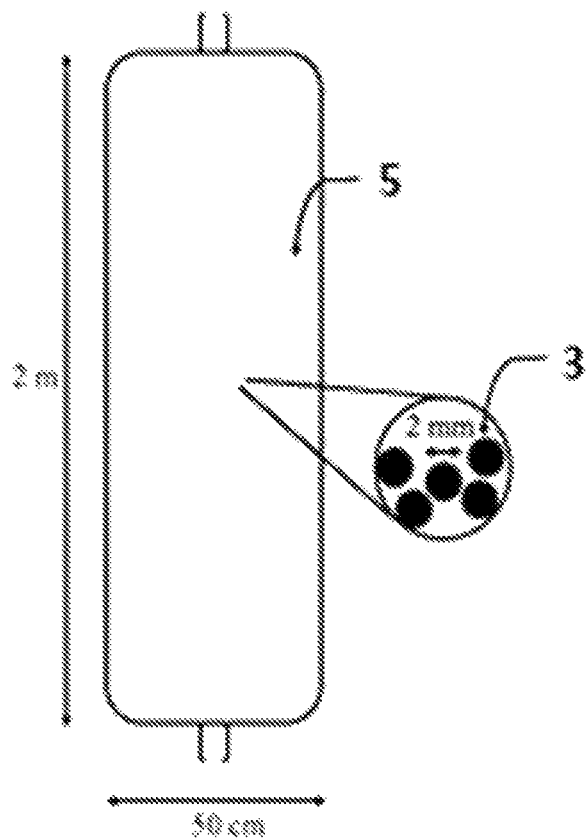
FIG. 3 depicts an ion exchange column 5 loaded with porous polymer beads 3 supporting coated ion exchange particle(s).

The coated ion exchange particles, porous structures, and/or porous beads are loaded into an ion exchange column. One example of an ion exchange column is shown in FIG. 3. The ion exchange column directs liquids to percolate around the coated ion exchange particles, porous structures, and/or porous beads, thereby facilitating ion exchange between the coated ion exchange particles, the uncoated ion exchange particles, and/or combinations thereof, and the liquid resource.

When the coated ion exchange particles, porous structures, and/or porous beads are used in an ion exchange column, the liquid resource containing lithium ions is pumped through the ion exchange column so that the coated ion exchange particles, the uncoated ion exchange particles, and/or combinations thereof absorb lithium from the liquid resource while releasing hydrogen. After the particles have absorbed lithium, an acid solution is pumped through the column so that the coated ion exchange particles, the uncoated ion exchange particles, and/or combinations thereof release lithium ions into the acid solution while absorbing hydrogen ions.

The column is optionally operated in co-flow mode with the liquid resource and acid solution alternately flowing through the column in the same direction or the column is optionally operated in counter-flow mode with a liquid resource and acid solution alternately flowing through the column in opposite directions. Between flows of the liquid resource and the acid solution, the column is optionally treated or washed with water or other solutions for purposes such as adjusting pH in the column or removing potential contaminants. Before or after the liquid resource flows through the column, the pH of the liquid is optionally adjusted with NaOH or other chemicals to facilitate the ion exchange reaction as well as handling or disposal of the spent liquid resource. Before or after the liquid resource flows through the column, the liquid resource is optionally subjected to other processes including other ion exchange processes, solvent extraction, evaporation, chemical treatment, or precipitation to remove lithium ions, to remove other chemical species, or to otherwise treat the brine. When the ion exchange particles are treated with acid, a lithium ion solution is produced. This lithium ion solution is further processed to produce lithium chemicals. In some embodiments, these lithium chemicals are supplied for an industrial application.

In some embodiments, lithium ions are extracted from a liquid resource. The liquid resource is a natural brine, a dissolved salt flat, a concentrated brine, a processed brine, a synthetic brine, an oilfield brine, liquid from an ion exchange process, liquid from a solvent extraction process, leachate from minerals, leachate from clays, leachate from recycled products, leachate from recycled materials, or combinations thereof.

Lithium Ion Salt Solutions

In an aspect described herein are lithium salt solutions with an impurity concentration of about 1 ppb to about 10 ppm wherein the impurity concentration denotes the presence of coated ion exchange particles during the production of the lithium salt solution. In some embodiments, the impurity is present in a concentration of more than 1 ppb, more than 5 ppb, more than 10 ppb, more than 100 ppb, more than 1 ppm, more than 2 ppm, more than 3 ppm, more than 4 ppm, more than 5 ppm, more than 6 ppm, more than 7 ppm, more than 8 ppm, more than 9 ppm, less than 10 ppm, less than 9 ppm, less than 8 ppm, less than 7 ppm, less than 6 ppm, less than 5 ppm, less than 4 ppm, less than 3 ppm, less than 2 ppm, less than 1 ppm, less than 100 ppb, less than 10 ppb, less than 5 ppb, from about 1 ppb to about 10 ppm, from about 5 ppb to about 10 ppm, from about 10 ppb to about 10 ppm, from about 50 ppb to about 10 ppm, from about 100 ppb to about 10 ppm, from about 1 ppm to about 10 ppm, from about 2 ppm to about 10 ppm, from about 4 ppm to about 10 ppm, from about 6 ppm to about ppm, or from about 8 ppm to about 10 ppm. When lithium ions are eluted from the coated ion exchange particles using an acid solution, some small amount of the coating material are dissolved. These dissolved elements will be released with the lithium. In some embodiments, the lithium is purified, but some very small concentration of elements from the coating material remain within the lithium product as an impurity. In some embodiments this impurity concentration is on the order of parts-per-billion, and is detected using Inductively Coupled Plasma-Atomic Emission Spectroscopy (ICP-AES) or Inductively Coupled Plasma-Mass Spectrometry (ICP-MS). In one embodiment, ICP-AES is used to measure impurity concentrations of Zr ions or Ti ions from $ZrO_2$ or $TiO_2$ coatings at wavelengths of 343.823 nm or 336.121 nm.

In some embodiments, the concentrated lithium ion solution is further processed into lithium raw materials using methods such as solvent extraction, ion exchange, chemical substitution, chemical precipitation, electrodialysis, electrowinning, evaporation, heat treatment, or combinations thereof. In some embodiments, the concentrated lithium ion solution is further processed into lithium chemicals such as lithium chloride, lithium carbonate, lithium hydroxide, lithium phosphate, lithium metal, lithium metal oxide, lithium metal phosphate, lithium sulfide, or combinations thereof.

In some embodiments, the lithium chemicals produced is used in an industrial application such as lithium batteries, metal alloys, glass, grease, or combinations thereof. In some embodiments, the lithium chemicals produced are used in an application such as lithium batteries, lithium-ion batteries, lithium sulfur batteries, lithium solid-state batteries, and combinations thereof.

EXAMPLES

Example 1

Synthesis of Coated Ion Exchange Particles ($Li_4Mn_5O_{12}/ZrO_2$)

The coated ion exchange particles are comprised of an ion exchange material and a coating material. The ion exchange material is $Li_4Mn_5O_{12}$ and the coating material is $ZrO_2$. The particles are created by first synthesizing $Li_4Mn_5O_{12}$ and then depositing the coating on the surface of the $Li_4Mn_5O_{12}$.

The ion exchange material, $Li_4Mn_5O_{12}$ is synthesized using hydrothermal synthesis, solid state synthesis, microwave synthesis or combinations thereof. The coating material ($ZrO_2$) is deposited on the surface of the $Li_4Mn_5O_{12}$ using chemical vapor deposition, hydrothermal deposition, solvothermal deposition, sol-gel deposition, precipitation, microwave deposition or by suspending $Li_4Mn_5O_{12}$ in a solvent and then adding reagents including metal chloride, metal oxychloride, metal alkoxide, water, acid, base, or combinations thereof. The particles comprise of 98 wt. % ion exchange material ($Li_4Mn_5O_{12}$) and 2 wt. % of the coating ($ZrO_2$). The particles have a mean diameter of 1 microns, and the coating thickness is approximately 2 nm.

Example 2

Synthesis of Coated Ion Exchange Particles ($Li_4Mn_5O_{12}/ZrO_2$)

The coated ion exchange particles were comprised of an ion exchange material and a coating material. The ion exchange material was $Li_4Mn_5O_{12}$ and the coating material was $ZrO_2$. The particles were created by first synthesizing $Li_4Mn_5O_{12}$ and then depositing the coating on the surface of the $Li_4Mn_5O_{12}$.

The $Li_4Mn_5O_{12}$ ion exchange material was synthesized using a solid-state method from electrolytic manganese dioxide and lithium nitrate precursors. The precursors were ball-milled using 5 mm $ZrO_2$ grinding media for 30 minutes in a planetary ball mill. The resulting mixture was fired in a furnace with a heating rate of 5° C./min up to 550° C. for 36 hours and then cooled slowly to room temperature. The resulting powder was comprised of $Li_4Mn_5O_{12}$ ion exchange material. A $ZrO_2$ coating was deposited on the $Li_4Mn_5O_{12}$ ion exchange material. The ion exchange material was suspended in a mixture of butanol, ethanol, and water with vigorous stirring, and a mixture of butanol and zirconium butoxide was dripped into the suspension over the course of 30 minutes. The suspension was stirred for 2 hours to allow the zirconium butoxide to react with the water and form a $ZrO_2$ precursor on the particle surfaces. The coated powder was then fired in a furnace at 400° C. for 2 hours. The resulting powder was coated ion exchange particles comprised of $Li_4Mn_5O_{12}$ particles with $ZrO_2$ coatings. The particles were comprised of 98 wt. % ion exchange material ($Li_4Mn_5O_{12}$) and 2 wt. % of the coating ($ZrO_2$). The particles had a mean diameter of 1 micron, and the coating thickness was approximately 2 nm.

Example 3

Synthesis of Coated Ion Exchange Particles ($Li_2TiO_3/SiO_2$)

The coated ion exchange particles were comprised of an ion exchange material and a coating material. The ion exchange material was $Li_2TiO_3$ and the coating material was $SiO_2$. The particles were created by first synthesizing $Li_2TiO_3$ and then depositing the $SiO_2$ coating on the surface of the $Li_2TiO_3$.

The $Li_2TiO_3$ powder was synthesized using a solid-state method from titanium dioxide and lithium carbonate precursors. The precursors were ball-milled using 5 mm $ZrO_2$ grinding media for 30 minutes in a planetary ball mill. The resulting mixture was fired in a furnace with a heating rate of 5° C./min up to 700° C. for 24 hours and then cooled slowly to room temperature. The resulting powder was comprised of $Li_2TiO_3$ ion exchange material. A $SiO_2$ coating was deposited on the $Li_2TiO_3$ ion exchange material. The ion exchange material was suspended in a mixture of ethanol and water with vigorous stirring, and a mixture of tetraethyl orthosilicate (TEOS), water, and hydrochloric acid was dripped into the suspension over the course of 120 minutes. The suspension was stirred for 2 hours to allow the TEOS to deposit on the particle surfaces, and the solvent was evaporated. The coated powder was then fired in a furnace at 400° C. for 2 hours. The resulting powder was coated ion exchange particles comprised of $Li_2TiO_3$ particles with $SiO_2$ coatings. The particles were comprised of 96 wt. % ion exchange material and 4 wt. % of the coating. The particles had a mean diameter of 4 microns, and the coating thickness was approximately 35 nm.

Example 4

Use of Coated Ion Exchange Particles ($Li_4Mn_5O_{12}/ZrO_2$)

Lithium is extracted from a brine using coated ion exchange particles ($Li_4Mn_5O_{12}/ZrO_2$). The brine is an aqueous solution containing 50,000 ppm Na and 1,000 ppm Li. The coated ion exchange particles are treated with HCl acid to yield LiCl in solution. During acid treatment, the coated ion exchange particles absorb hydrogen ions while releasing lithium ions. The $Li_4Mn_5O_{12}$ active material is converted to a protonated state. The $ZrO_2$ coating allows diffusion of hydrogen and lithium respectively to and from the active material while providing a protective barrier that limits dissolution of manganese and oxygen from the active material. The solution is collected for elemental analysis to measure lithium yield.

After treatment in acid, the protonated coated ion exchange particles are treated with brine wherein the coated ion exchange particles absorb lithium ions while releasing hydrogen ions. The coated ion exchange particles are converted from a protonated state to a lithiated state. The solution is collected for elemental analysis to measure lithium uptake.

The lithiated coated ion exchange particles are then treated again with acid to yield lithium ions in solution. The cycle of protonation and lithiation is repeated to extract lithium ions from the brine and yield a LiCl solution. Dissolution and degradation of the active material in acid is limited due to the coating providing a protective barrier. Dissolution of the active material is measured through elemental analysis of the acid solution following stirring.

Example 5

Use of Coated Ion Exchange Particles ($Li_2TiO_3/SiO_2$)

Figure 4:
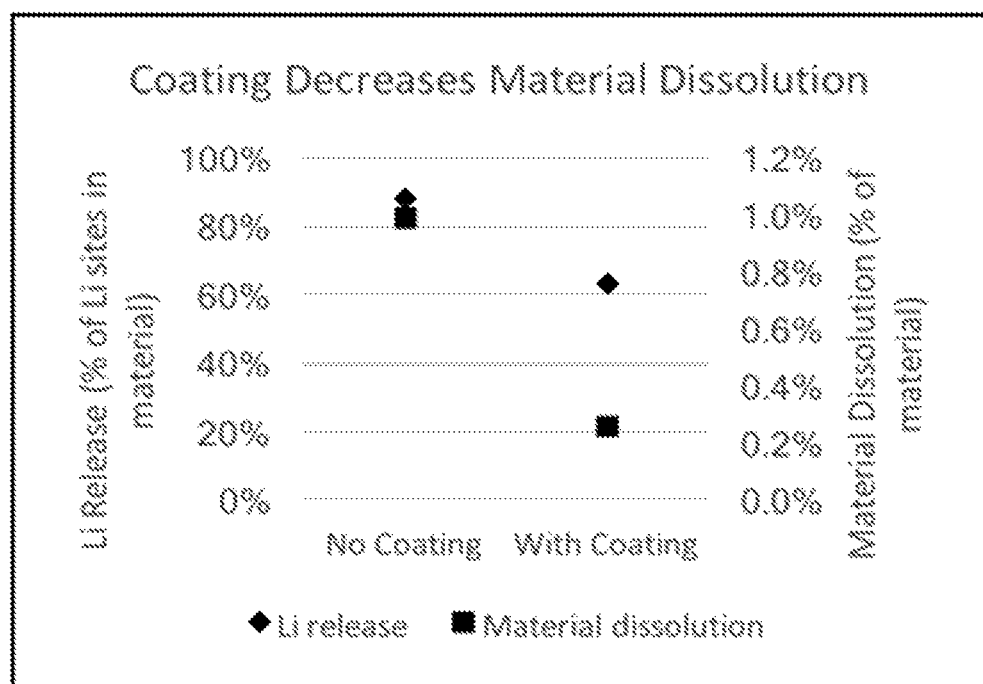
FIG. 4 demonstrates decreased dissolution during acid treatment for coated ion exchange particles relative to uncoated ion exchange particles.

Lithium was extracted from a brine using coated ion exchange particles ($Li_2TiO_3/SiO_2$). The brine was an aqueous solution containing 50,000 ppm Na, 30,000 ppm Ca, 5,000 ppm Mg, and 100 ppm Li. The coated ion exchange particles were treated with HCl acid to yield LiCl in solution. During acid treatment, the coated ion exchange particles absorbed hydrogen ions while releasing lithium ions. The $Li_2TiO_3$ active material was converted to a protonated state. The $SiO_2$ coating allowed diffusion of hydrogen ions and lithium ions respectively to and from the active material while providing a protective barrier that limited dissolution of titanium and oxygen from the active material. The solution was collected for elemental analysis to measure lithium yield. FIG. 4. depicts the effect of the coating, which limits dissolution of the material while allowing lithium release.

After treatment in acid, the protonated coated ion exchange particles were treated with brine wherein the coated ion exchange particles absorbed lithium ions while releasing hydrogen ions. The particles were converted from a protonated state to a lithiated state. The solution was then collected for elemental analysis to measure lithium uptake.

The lithiated coated ion exchange particles were then treated again with acid to yield lithium in solution. The cycle of protonation and lithiation was repeated to extract lithium ions from the brine and yield a LiCl solution. Dissolution and degradation of the active material in acid was limited due to the coating providing a protective barrier. Dissolution of the active material was measured through elemental analysis of the acid solution following stirring.

Example 6

Use of Porous Beads Containing Coated Ion Exchange Particles ($Li_4Mn_5O_{12}/ZrO_2$)

Lithium is extracted from a brine using porous beads. The porous beads are comprised of coated ion exchange particles ($Li_4Mn_5O_{12}/ZrO_2$) and a polymer matrix. The coated ion exchange particles are comprised of a $Li_4Mn_5O_{12}$ with a $ZrO_2$ coating. The ion exchange particles contain 95 wt % $Li_4Mn_5O_{12}$ and 5 wt % $ZrO_2$. The particles are approximately spherical with a mean diameter of 2 microns, and the coating thickness is approximately 12 nm. The polymer matrix is comprised of polyvinylidene fluoride. The porous beads are created by dissolving polyvinylidene fluoride in N-methyl-2-pyrrolidone (NMP) to form a solution. This solution is then mixed with the coated ion exchange particles to form a slurry. The slurry is dripped into an aqueous solution to form beads. The porous beads are comprised of 10 wt. % polyvinylidene fluoride matrix and 90 wt. % coated ion exchange particles. The porous beads have an average diameter of 2 mm and a porosity of 35%.

The porous beads contain pores with a distribution of pore sizes providing diffusion channels from the bead surface into the bead interior and to the ion exchange particles. When the porous beads are submerged in aqueous or other solutions, the pores are infiltrated with the solutions. The beads have a distribution of shapes that are approximately spherical on average with a 1 mm average diameter.

The brine is an aqueous chloride solution containing 100 ppm Li, 40,000 ppm Na, 30,000 ppm Ca, and 3,000 ppm Mg. The porous beads are treated with HCl acid to yield LiCl in solution. 1 g of the beads are stirred in 30 mL of 1 M HCl acid for 4 hours at room temperature. The pores in the beads allow the acid solution to penetrate into the bead and access the ion exchange particles. Therefore, the ion exchange particles absorb hydrogen ions from the acid while releasing lithium ions into the acid. The $Li_4Mn_5O_{12}$ of the coated ion exchange particles in the porous beads is converted to a protonated state $Li_{4-x}H_xMn_5O_{12}$ where x may be about to 3.5. The $ZrO_2$ coating of the coated ion exchange particles allows diffusion of hydrogen ions and lithium ions respectively to and from the ion exchange material while providing a protective barrier that limits dissolution of manganese and oxygen from the ion exchange material. After 4 hours of stirring, the solution is collected for elemental analysis to measure lithium yield.

After treatment in acid, the protonated porous beads are treated with brine wherein the coated ion exchange particles absorb lithium ions while releasing hydrogen ions. The protonated porous beads are stirred in 500 mL of brine for 4 hours at room temperature. The pores in the porous beads allow the brine solution to penetrate into the porous bead and access the coated ion exchange particles. Therefore, the coated ion exchange particles absorb lithium ions from the brine while releasing hydrogen ions into the brine. The coated ion exchange particles in the porous beads are converted from a protonated state to a lithiated state $Li_{4-x}H_xMn_5O_{12}$ where x may be about to 2. After 4 hours of stirring, the solution is collected for elemental analysis to measure lithium uptake.

The lithiated porous beads are then treated again with acid to yield lithium ions in. The cycle of protonation and lithiation is repeated to extract lithium ions from the brine and yield a LiCl solution. The pores in the porous beads facilitate penetration of the acid and brine solutions into the porous beads, facilitating absorption and release of lithium ions and hydrogen ions by the coated ion exchange particles ($Li_4Mn_5O_{12}/ZrO_2$) in the porous bead. Dissolution and degradation of the active material in acid is limited due to the $ZrO_2$ coating providing a protective barrier. Dissolution of the active material is measured with elemental analysis of the acid solution following stirring.

Example 7

Use of Porous Beads Containing Coated Ion Exchange Particles ($Li_4Mn_5O_{12}/ZrO_2$) in a Column Lithium is extracted from a brine using an ion exchange column loaded with porous beads containing coated ion exchange particles ($Li_4Mn_5O_{12}/ZrO_2$).

The coated ion exchange particles are comprised of an active material and a protective surface coating. The active material is $Li_4Mn_5O_{12}$ and the coating is $ZrO_2$. The particles are created by synthesizing $Li_4Mn_5O_{12}$ and then depositing the coating on the surface of the $Li_4Mn_5O_{12}$. The coated ion exchange particles are comprised of 95 wt. % active material constitutes and 5 wt. % of the coating and have a mean diameter of 2 microns, and a coating thickness is approximately 12 nm.

The porous beads are created by dissolving polyvinylidene fluoride in N-methyl-2-pyrrolidone (NMP) to form a solution. This solution is then mixed with the coated ion exchange particles to form a slurry. The slurry is dripped into an aqueous solution to form beads. The porous beads are comprised of 10 wt. % polyvinylidene fluoride matrix and 90 wt. % coated ion exchange particles. The porous beads have an average diameter of 2 mm and a porosity of 35%.

The brine is natural brine containing approximately 500 ppm Li, 50,000 ppm Na, and other chemical species including K, Mg, Ca, and sulfate.

The ion exchange column is 2 meters in length and 50 cm in diameter. The column is loaded with the porous beads. 10 M HCl is pumped into the bottom of the column to elute a LiCl solution out the top of the column. The coated ion exchange particles absorb hydrogen ions while releasing lithium ions to yield LiCl. The $Li_4Mn_5O_{12}$ active material is converted to a protonated state. Lithium recovery from the column is monitored using pH measurements and elemental analysis. After lithium recovery, the column is flushed with water.

After acid treatment, brine is pumped down through the column. The coated ion exchange particles absorb lithium ions while releasing hydrogen ions. The protonated material is converted to a lithiated state. Lithium ion uptake by the porous beads in the column is monitored using pH measurements and elemental analysis. The brine exiting the column is adjusted to a neutral pH using NaOH. After lithium ion uptake, the column is flushed with water.

The column is operated by repeating the previously described steps of acid and brine pumping in alternation. This column operates to extract lithium from the brine and produce a concentrated LiCl solution. During column operation, the coated ion exchange particles are protected from dissolution and degradation due to the surface coating, which provides a protective barrier.

The LiCl solution from the column operation is processed into lithium raw materials including $Li_2CO_3$, LiOH, and Li metal. These lithium raw materials are sold for use in batteries, alloys, and other products.

Example 8

Use of Porous Beads Containing Coated Ion Exchange Particles ($Li_2TiO_3/SiO_2$) in a Column Lithium is extracted from a brine using an ion exchange column loaded with porous beads containing coated ion exchange particles.

The coated ion exchange particles ($Li_2TiO_3/SiO_2$) are comprised of an active material and a protective surface coating. The active material is $Li_2TiO_3$ and the coating is $SiO_2$. The particles are created by synthesizing $Li_2TiO_3$ and then depositing the $SiO_2$ coating on the surface of the $Li_2TiO_3$. The coated ion exchange particles are comprised of 96 wt. % active material and 4 wt. % of the coating and have a mean diameter of 4 microns, and the coating thickness is approximately 35 nm.

The porous beads are created by dissolving polyvinylchloride in N-methyl-2-pyrrolidone (NMP) to form a solution. This solution is then mixed with the coated ion exchange particles to form a slurry. The slurry is dripped into an aqueous solution to form porous beads. The beads are comprised of 20 wt. % polyvinyl chloride matrix and 80 wt. % coated ion exchange particles. The beads have an average diameter of 1 mm and a porosity of 25%.

The brine is a natural brine containing approximately 50 ppm Li, 60,000 ppm Na, and other chemical species including K, Mg, Ca, and Cl.

The ion exchange column is 2 meters in length and 50 cm in diameter. The column is loaded with the beads. 0.5 M HCl is pumped into the bottom of the column to elute a LiCl solution out the top of the column. The coated ion exchange particles absorb hydrogen ions while releasing lithium ions to yield LiCl. The $Li_2TiO_3$ active material is converted to a protonated state. Lithium recovery from the column is monitored using pH measurements and elemental analysis. After lithium recovery, the column is flushed with water.

After acid treatment, brine is pumped down through the column. The coated ion exchange particles ($Li_2TiO_3/SiO_2$) absorb lithium ions while releasing hydrogen ions. The protonated material is converted to a lithiated state. Lithium ion uptake by the porous beads in the column is monitored using pH measurements and elemental analysis. The brine exiting the column is adjusted to a neutral pH using NaOH. After lithium uptake, the column was flushed with an aqueous solution to remove contaminants.

The column is operated by repeating the previously described steps of acid and brine pumping in alternation. This column is operated to extract lithium from the brine and produce a concentrated LiCl solution. During column operation, the ion exchange particles are protected from dissolution and degradation due to the surface coating, which provides a protective barrier.

The LiCl solution from the column operation is processed into lithium raw materials including $Li_2CO_3$, LiOH, and Li metal. These lithium raw materials are sold for use in batteries, alloys, and other products.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of extracting lithium from a liquid resource, comprising:
   (a) contacting a coated ion exchange particle comprising an ion exchange material and a coating material, with a liquid resource to produce lithiated coated ion exchange particles; and
   (b) treating the lithiated coated ion exchange particles with an acid solution to produce a salt solution comprising lithium ions,
   wherein the ion exchange material is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof; wherein x is from 0.1-10; and y is from 0.1-10; and
   wherein the coating material comprises $TiO_2$, $ZrO_2$, $MoO_2$, $SnO_2$, $Nb_2O_5$, $Ta_2O_5$, $Li_2TiO_3$, $SiO_2$, $Li_2ZrO_3$, $Li_2MoO_3$, $LiNbO_3$, $LiTaO_3$, $AlPO_4$, $LaPO_4$, $ZrSiO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, solid solutions thereof, or a combination thereof.

2. The method of claim 1, wherein the salt solution further comprises an impurity derived from the coated ion exchange particle.

3. The method of claim 2, wherein the impurity is present in a concentration of about 1 ppb to about 10 ppm.

4. The method of claim 1, wherein the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

5. The method of claim 1, wherein the acid solution comprises hydrochloric acid, sulfuric acid, phosphoric acid, hydrobromic acid, chloric acid, perchloric acid, nitric acid, formic acid, acetic acid, or combinations thereof.

6. The method of claim 1, wherein the coating material limits dissolution of the ion exchange material.

7. The method of claim 1, wherein the coating material allows diffusion of lithium ions and hydrogen ions to and from the ion exchange material.

8. The method of claim 1, wherein the ion exchange material is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiTiO_2$, $Li_4TiO_4$, $Li_7Ti_{11}O_{24}$, $LiFePO_4$, and $LiMnPO_4$.

9. The method of claim 1, wherein the ion exchange material is selected from the group consisting of $Li_4Mn_5O_{12}$, $Li_2MnO_3$, $LiMn_2O_4$, $Li_{1.6}Mn_{1.6}O_4$, and $LiMnPO_4$.

10. The method of claim 1, wherein the ion exchange material is selected from the group consisting of $Li_4Ti_5O_{12}$, $Li_2TiO_3$, $LiTiO_2$, $Li_4TiO_4$, and $Li_7Ti_{11}O_{24}$.

11. The method of claim 1, wherein the ion exchange material is selected from the group consisting of $Li_2SnO_3$ and $LiFePO_4$.

12. The method of claim 1, wherein the coating material comprises $TiO_2$, $ZrO_2$, $MoO_2$, $Li_2TiO_3$, $SiO_2$, $Li_2ZrO_3$, $Li_2MoO_3$, $LiNbO_3$, $ZrSiO_4$, $AlF_3$, SiC, $Si_3N_4$, graphitic carbon, amorphous carbon, solid solutions thereof, or a combination thereof.

13. The method of claim 1, wherein the coating material comprises $TiO_2$, $ZrO_2$, or $SiO_2$.

14. The method of claim 1, wherein the ion exchange material is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiTiO_2$, $Li_4TiO_4$, $Li_7Ti_{11}O_{24}$, $LiFePO_4$, and $LiMnPO_4$, and the coating material comprises $TiO_2$, $ZrO_2$, or $SiO_2$.

15. The method of claim 1, wherein the ion exchange material is selected from the group consisting of $Li_4Mn_5O_{12}$, $Li_2MnO_3$, $LiMn_2O_4$, $Li_{1.6}Mn_{1.6}O_4$, and $LiMnPO_4$, and the coating material comprises $TiO_2$, $ZrO_2$, or $SiO_2$.

16. The method of claim 1, wherein the ion exchange material is selected from the group consisting of $Li_4Ti_5O_{12}$, $Li_2TiO_3$, $LiTiO_2$, $Li_4TiO_4$, and $Li_7Ti_{11}O_{24}$, and the coating material comprises $TiO_2$, $ZrO_2$, or $SiO_2$.

17. The method of claim 1, wherein the ion exchange material is selected from the group consisting of $Li_2SnO_3$ and $LiFePO_4$, and the coating material comprises $TiO_2$, $ZrO_2$, or $SiO_2$.

18. The method of claim 1, wherein the coated ion exchange particle has an average diameter from about 20 μm to about 200 μm.

19. The method of claim 1, wherein the coated ion exchange particle has an average diameter of less than 100 μm.

20. The method of claim 1, wherein the coated ion exchange particle has an average diameter of less than 60 μm.

21. The method of claim 1, wherein the coated ion exchange particle has an average diameter of less than 30 μm.

22. The method of claim 1, wherein the coated ion exchange particle has an average diameter of less than 20 μm.

* * * * *